United States Patent
Taya et al.

(10) Patent No.: US 12,359,096 B2
(45) Date of Patent: *Jul. 15, 2025

(54) HIGH-FREQUENCY DIELECTRIC HEATING ADHESIVE SHEET

(71) Applicant: LINTEC CORPORATION, Tokyo (JP)

(72) Inventors: Naoki Taya, Tokyo (JP); Sou Miyata, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 244 days.

This patent is subject to a terminal disclaimer.

(21) Appl. No.: 17/915,059

(22) PCT Filed: Mar. 26, 2021

(86) PCT No.: PCT/JP2021/012957
§ 371 (c)(1),
(2) Date: Sep. 27, 2022

(87) PCT Pub. No.: WO2021/200685
PCT Pub. Date: Oct. 7, 2021

(65) Prior Publication Data
US 2024/0010878 A1   Jan. 11, 2024

(30) Foreign Application Priority Data
Mar. 31, 2020 (JP) ................. 2020-063291

(51) Int. Cl.
*C09J 7/30* (2018.01)
*B32B 27/08* (2006.01)
(Continued)

(52) U.S. Cl.
CPC ............. *C09J 7/30* (2018.01); *B32B 27/08* (2013.01); *B32B 27/20* (2013.01); *B32B 27/302* (2013.01);
(Continued)

(58) Field of Classification Search
CPC ....... B32B 27/08; B32B 27/20; B32B 27/302; B32B 27/32; B32B 27/36;
(Continued)

(56) References Cited

U.S. PATENT DOCUMENTS

2020/0087541 A1* 3/2020 Ishikawa ............. B32B 7/12

FOREIGN PATENT DOCUMENTS

| CN | 107531037 A | 1/2018 |
| CN | 110300782 A | 10/2019 |

(Continued)

OTHER PUBLICATIONS

First Office Action received in Chinese Patent Application No. 202180026859.8, dated Dec. 21, 2023.
(Continued)

*Primary Examiner* — S. Behrooz Ghorishi
(74) *Attorney, Agent, or Firm* — Rimon P.C.

(57) ABSTRACT

A high-frequency dielectric heating adhesive sheet includes: a first bonding layer containing a first thermoplastic resin and a first dielectric filler; and a second bonding layer containing a second thermoplastic resin and a second dielectric filler. A volume content VA1 of the first thermoplastic resin in the first bonding layer and a volume content VA2 of the second thermoplastic resin in the second bonding layer are in a range from 60% by volume to 100% by volume. Change rates Vx1 and Vx2 represented by formulas below are less than 80%. VB1 is the volume content of the first thermoplastic resin in a layer in direct contact with the first bonding layer, and VB2 is the volume content of the second (Continued)

thermoplastic resin in a layer in direct contact with the second bonding layer. (Formula 1): $Vx1=\{(VA1-VB1)/VA1\}\times100$ (Formula 2): $Vx2=\{(VA2-VB2)/VA2\}\times100$

11 Claims, 4 Drawing Sheets

(51) Int. Cl.
| | |
|---|---|
| B32B 27/20 | (2006.01) |
| B32B 27/30 | (2006.01) |
| B32B 27/32 | (2006.01) |
| B32B 27/36 | (2006.01) |
| C08K 3/22 | (2006.01) |
| C09J 9/02 | (2006.01) |
| C09J 11/04 | (2006.01) |
| C09J 123/12 | (2006.01) |
| C09J 125/08 | (2006.01) |
| C09J 133/12 | (2006.01) |
| H05B 6/46 | (2006.01) |

(52) U.S. Cl.
CPC ............ *B32B 27/32* (2013.01); *B32B 27/36* (2013.01); *C09J 9/02* (2013.01); *C09J 11/04* (2013.01); *C09J 123/12* (2013.01); *C09J 125/08* (2013.01); *C09J 133/12* (2013.01); *H05B 6/46* (2013.01); *B32B 2264/1025* (2020.08); *B32B 2264/303* (2020.08); *B32B 2270/00* (2013.01); *B32B 2307/204* (2013.01); *B32B 2307/30* (2013.01); *B32B 2307/748* (2013.01); *B32B 2405/00* (2013.01); *C08K 2003/2296* (2013.01); *C08K 2201/001* (2013.01); *C08K 2201/005* (2013.01); *C09J 2301/314* (2020.08); *C09J 2301/408* (2020.08); *C09J 2423/10* (2013.01); *C09J 2425/00* (2013.01); *C09J 2433/00* (2013.01)

(58) Field of Classification Search
CPC ...... B32B 2264/1025; B32B 2264/303; B32B 2270/00; B32B 2307/204; B32B 2307/30; B32B 2307/748; B32B 2405/00; B32B 2250/24; B32B 7/12; C09J 7/30; C09J 9/02; C09J 11/04; C09J 123/12; C09J 125/08; C09J 133/12; C09J 2301/314; C09J 2301/408; C09J 2423/10; C09J 2425/00; C09J 2433/00; C09J 2301/1242; C09J 2423/00; H05B 6/46; C08K 2003/2296; C08K 2201/001; C08K 2201/005
See application file for complete search history.

(56) References Cited

FOREIGN PATENT DOCUMENTS

| | | |
|---|---|---|
| CN | 110494525 A | 11/2019 |
| EP | 2703462 A1 | 3/2014 |
| JP | S58-174474 A | 10/1983 |
| JP | H08-258173 A | 10/1996 |
| JP | H08-281873 A | 10/1996 |
| JP | 2014-37489 A | 2/2014 |
| JP | 2018-177825 A | 11/2018 |
| WO | 2018/186297 A1 | 10/2018 |

OTHER PUBLICATIONS

English translation of the International Preliminary Report on Patentability issued in corresponding International Patent Application No. PCT/JP2021/012957, dated Sep. 29, 2022.
International Search Report issued in corresponding International Patent Application No. PCT/JP2021/012957, dated Jun. 22, 2021, with English translation.
Search Report issued Apr. 25, 2024, for the corresponding European Patent Application No. 21779165.6, 7 pages.

* cited by examiner

HIGH-FREQUENCY DIELECTRIC HEATING ADHESIVE SHEET

CROSS REFERENCE TO RELATED APPLICATIONS

This patent application is the U.S. National Phase under 35 U.S.C. § 371 of International Application No. PCT/JP2021/012957, filed on Mar. 26, 2021, which claims the benefit of Japanese Patent Application No. 2020-063291, dated Mar. 31, 2020, the entire contents of each are hereby incorporated by reference in their entirety.

TECHNICAL FIELD

The present invention relates to a high-frequency dielectric heating adhesive sheet.

BACKGROUND ART

In one recently proposed method of bonding adherends that are generally not easily bonded together, for example, an adhesive prepared by mixing a heat-generating material into a predetermined resin is interposed between the adherends, and then dielectric heating, induction heating, ultrasonic welding, or laser welding is performed.

For example, Patent Literature 1 discloses a sheet-shaped thermal adhesive containing at least one type of fine powder selected from the group consisting of carbon black, silicon oxide, metals, and metal oxides.

CITATION LIST

Patent Literature (s)

Patent Literature 1: JP No. 58-174474 A

SUMMARY OF INVENTION

Problems to be Solved by the Invention

When the thermal adhesive described in Patent Literature 1 is used to bond adherends (a first adherend and a second adherend) made of different materials together, sufficient adhesion strength may not be obtained. In particular, when the adherends are made of materials that are not easily bondable, sufficient adhesion strength is not easily obtained.

An object of the invention is to provide a high-frequency dielectric heating adhesive sheet that can firmly bond first and second adherends formed of different materials together.

Means for Solving the Problem(S)

According to an aspect of the invention, there is provided a high-frequency dielectric heating adhesive sheet including: a first bonding layer serving as an outermost layer; and a second bonding layer serving as an outermost layer and located on a side opposite to the first bonding layer, in which the first bonding layer includes: a first thermoplastic resin; and a first dielectric filler that generates heat under application of a high-frequency wave, the second bonding layer includes: a second thermoplastic resin; and a second dielectric filler that generates heat under application of a high-frequency wave, the first thermoplastic resin and the second thermoplastic resin are different resins, a volume content VA1 of the first thermoplastic resin with respect to a total volume of all thermoplastic resins in the first bonding layer is in a range from 60% by volume to 100% by volume, a volume content VA2 of the second thermoplastic resin with respect to the total volume of all thermoplastic resins in the second bonding layer is in a range from 60% by volume to 100% by volume, a change rate Vx1 represented by a numerical formula (Numerical Formula 1) below and indicating a rate of change between the volume content VA1 of the first thermoplastic resin and a volume content VB1 of the first thermoplastic resin with respect to the total volume of all thermoplastic resins in a layer in direct contact with the first bonding layer is less than 80%, and a change rate Vx2 represented by a numerical formula (Numerical Formula 2) below and indicating a rate of change between the volume content VA2 of the second thermoplastic resin and a volume content VB2 of the second thermoplastic resin with respect to the total volume of all thermoplastic resins in a layer in direct contact with the second bonding layer is less than 80%, $$Vx1=\{(VA1-VB1)/VA1\}\times 100 \quad \text{(Numerical Formula 1)}$$

$$Vx2=\{(VA2-VB2)/VA2\}\times 100 \quad \text{(Numerical Formula 2)}.$$

In the high-frequency dielectric heating adhesive sheet according to the above aspect of the invention, it is preferable that the high-frequency dielectric heating adhesive sheet is a sheet for bonding together a first adherend and a second adherend made of a material different from a material forming the first adherend, the first adherend includes a third thermoplastic resin, the second adherend includes a fourth thermoplastic resin, a main component of the first thermoplastic resin is the same as a main component of the third thermoplastic resin, a main component of the second thermoplastic resin is the same as a main component of the fourth thermoplastic resin, the first bonding layer is bonded to the first adherend, and the second bonding layer is bonded to the second adherend.

In the high-frequency dielectric heating adhesive sheet according to the above aspect of the invention, it is preferable that at least one of a volume content of the first dielectric filler in the first bonding layer or a volume content of the second dielectric filler in the second bonding layer is in a range from 5% by volume to 50% by volume.

In the high-frequency dielectric heating adhesive sheet according to the above aspect of the invention, it is preferable that at least one of the first dielectric filler or the second dielectric filler is at least one selected from the group consisting of zinc oxide, silicon carbide, titanium oxide, and barium titanate.

In the high-frequency dielectric heating adhesive sheet according to the above aspect of the invention, it is preferable that at least one of a volume average particle size of the first dielectric filler or a volume average particle size of the second dielectric filler is in a range from 1 μm to 30 μm, and the volume average particle size is determined by measuring a particle size distribution of the at least one of the first dielectric filler or the second dielectric filler by a laser diffraction/scattering method and calculating the volume average particle size according to JIS Z 8819-2:2001 from results of the measurement of the particle size distribution.

In the high-frequency dielectric heating adhesive sheet according to the above aspect of the invention, it is preferable that the first thermoplastic resin is a polyolefin resin.

In the high-frequency dielectric heating adhesive sheet according to the above aspect of the invention, it is preferable that an absolute value of a difference between a flow start temperature Tx1 of the first thermoplastic resin and a flow start temperature Tx2 of the second thermoplastic resin satisfies a relationship of a numerical formula (Numerical Formula 4) below, $$|Tx1-Tx2| \leq 70 \quad \text{(Numerical Formula 4)}.$$

In the high-frequency dielectric heating adhesive sheet according to the above aspect of the invention, it is preferable that in each of the layers included in the high-frequency dielectric heating adhesive sheet, after a cross-cut test according to JIS K5600-5-6:1999, a ratio of the number of grids that are not peeled off from and are adhering to a layer in contact with the each of the layers is 50% or more.

The high-frequency dielectric heating adhesive sheet according to the above aspect of the invention preferably further includes an intermediate layer disposed between the first bonding layer and the second bonding layer.

In the high-frequency dielectric heating adhesive sheet according to the above aspect of the invention, it is preferable that the intermediate layer contains the first thermoplastic resin and the second thermoplastic resin.

In the high-frequency dielectric ting adhesive sheet according to the above aspect of the invention, it is preferable that the first bonding layer is in direct contact with the intermediate layer, and the second bonding layer is in direct contact with the intermediate layer.

In the high-frequency dielectric heating adhesive sheet according to the above aspect of the invention, it is preferable that the layer in direct contact with the first bonding layer is the second bonding layer.

According to the above aspect of the invention, the high-frequency dielectric heating adhesive sheet in which the first adherend and the second adherend made of different materials can be firmly bonded together can be provided.

DESCRIPTION OF EMBODIMENTS

First Exemplary Embodiment

High-Frequency Dielectric Heating Adhesive Sheet

A high-frequency dielectric heating adhesive sheet in a first exemplary embodiment includes: a first bonding layer serving as an outermost layer; and a second bonding layer serving as an outermost layer and located on a side opposite to the first bonding layer.

The first bonding layer contains a first thermoplastic resin and a first dielectric filler that generates heat under application of a high-frequency wave.

The second bonding layer contains a second thermoplastic resin and a second dielectric filler that generates heat under application of a high-frequency wave.

The first thermoplastic resin and the second thermoplastic resin are different resins.

A volume content VA1 of the first thermoplastic resin with respect to the total volume of all thermoplastic resins in the first bonding layer is in a range from 60% by volume to 100% by volume.

A volume content VA2 of the second thermoplastic resin with respect to the total volume of all thermoplastic resins in the second bonding layer is in a range from 60% by volume to 100% by volume.

A change rate Vx1 represented by a numerical formula (Numerical Formula 1) below and indicating a rate of change between the volume content VA1 of the first thermoplastic resin and a volume content VB1 of the first thermoplastic resin with respect to the total volume of all thermoplastic resins in a layer in direct contact with the first bonding layer is less than 80%.

A change rate Vx2 represented by a numerical formula (Numerical Formula 2) below and indicating a rate of change between the volume content VA2 of the second thermoplastic resin and a volume content VB2 of the second thermoplastic resin with respect to the total volume of all thermoplastic resins in a layer in direct contact with the second bonding layer is less than 80%.

$$Vx1 = \{(VA1-VB1)/VA1\} \times 100 \quad \text{(Numerical Formula 1)}$$

$$Vx2 = \{(VA2-VB2)/VA2\} \times 100 \quad \text{(Numerical Formula 2)}$$

The change rate Vx1 is preferably more than 0%, more preferably 10% or more, still more preferably 20% or more, still further more preferably 25% or more.

The change rate Vx1 is preferably 75% or less.

The change rate Vx2 is preferably more than 0%, more preferably 10% or more, still more preferably 20% or more, still further more preferably 25% or more.

The change rate Vx2 is preferably 75% or less.

The change rates Vx1 and Vx2 are mutually the same or different.

Since both the change rates Vx1 and Vx2 are less than 80%, the high-frequency dielectric heating adhesive sheet obtained is less likely to undergo interfacial peeling.

The unit of the volume contents VA1, VB1, VA2, and VB2 is % by volume.

With the high-frequency dielectric heating adhesive sheet according to the exemplary embodiment, a first adherend and a second adherend made of different materials can be bonded together.

The details of the high-frequency dielectric heating adhesive sheet according to the exemplary embodiment will next be described.

Figure 1:
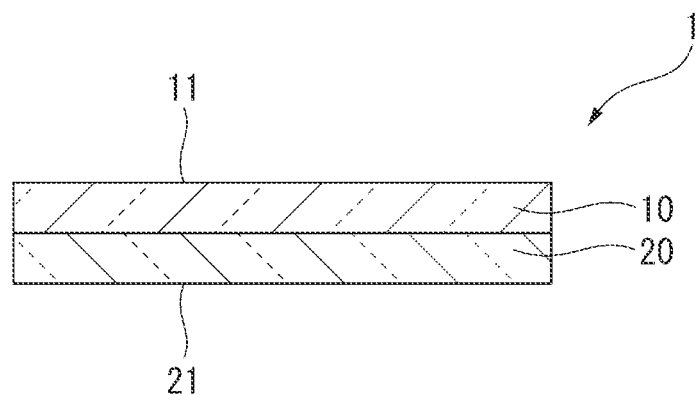
FIG. 1 is a schematic illustration of a high-frequency dielectric heating adhesive sheet according to a first exemplary embodiment.

FIG. 1 shows a schematic cross-sectional view of an example of the high-frequency dielectric heating adhesive sheet according to the exemplary embodiment. A high-frequency dielectric heating adhesive sheet 1 includes: a first bonding layer 10 serving as an outermost layer; and a second bonding layer 20 serving as an outermost layer and located on a side opposite to the first bonding layer 10. The high-frequency dielectric heating adhesive sheet 1 has a first surface 11 and a second surface 21 opposite to the first surface 11.

In the high-frequency dielectric heating adhesive sheet 1, the layer in direct contact with the first bonding layer 10 is the second bonding layer 20. When the first bonding layer 10 is in direct contact with the second bonding layer 20, the meanings of the symbols in the above numerical formulas (Numerical Formula 1) and (Numerical Formula 2) are as follows.

VA1: the volume content of the first thermoplastic resin with respect to the total volume of all thermoplastic resins in the first bonding layer 10, VB31: the volume content of the first thermoplastic resin with respect to the total volume of all thermoplastic resins in the second bonding layer 20.

VA2: the volume content of the second thermoplastic resin with respect to the total volume of all the thermoplastic resins in the second bonding layer 20.

VB2: the volume content of the second thermoplastic resin with respect to the total volume of all the thermoplastic resins in the first bonding layer 10.

Thermoplastic Resin

In the high-frequency dielectric heating adhesive sheet according to the exemplary embodiment, the first thermoplastic resin and the second thermoplastic resin are different resins.

The type of first thermoplastic resin and the type of second thermoplastic resin are not particularly limited.

For example, the first thermoplastic resin and the second thermoplastic resin are each preferably at least one selected from the group consisting of polyolefin resins, polyolefin resins having a polar moiety, styrene resins, polyacetal resins, polycarbonate resins, polyacrylic resins, polyimide resins, polyimide resins, polyvinyl acetate resins, phenoxy resins, and polyester resins because these resins are easily fused and have predetermined heat resistance.

The first thermoplastic resin is preferably a polyolefin resin.

The second thermoplastic resin is preferably a styrene resin.

It is also preferable h least one of the first thermoplastic resin or the second thermoplastic resin is a polyolefin resin or a polyolefin resin having a polar moiety. At least one of the first thermoplastic resin or the second thermoplastic resin may be a polyolefin resin having no polar moiety.

Polyolefin Resin

Examples of the polyolefin resin used as the thermoplastic resin include: a resin formed from a homopolymer such as polyethylene, polypropylene, polybutene, and polymethylpentene; and an α-olefin resin formed from a copolymer of monomers selected from the group consisting of ethylene, propylene, butene, hexene, octane, 4-methylpentene and the like. The polyolefin resin used as the thermoplastic resin may be a single resin or a combination of two or more resins, Polyolefin Resin Having Polar Moiety Any moiety that can impart polarity to the polyolefin resin can be the polar moiety in the polyolefin resin having the polar moiety. The polyolefin resin having the polar moiety is preferred because of exerting a high adhesive force on an adherend.

The thermoplastic resin may be a copolymer of an olefin monomer and a monomer having a polar moiety. The thermoplastic resin may be a resin prepared by introducing a polar moiety through modification such as an addition reaction into an olefin polymer obtained by polymerization of an olefin monomer.

The type of olefin monomer included in the polyolefin resin having a polar moiety that is used as the thermoplastic resin is not particularly limited. Examples of the olefin monomer include ethylene, propylene, butene, hexene, octane, and 4-methyl-1-pentene. One type of these olefin monomers may be used alone, or a combination of two or more types thereof may be used.

Ethylene and propylene are preferable olefin monomers because of imparting high mechanical strength and stable bonding properties.

A structural unit derived from an olefin in the polyolefin resin having a polar moiety is preferably a structural unit derived from ethylene or propylene.

Examples of the polar moiety include a hydroxy group, a carboxy group, a vinyl acetate structure, acid anhydride structures, and acid-modified structures introduced into the polyolefin resin by acid modification.

The acid-modified structure serving as the polar moiety is a moiety introduced by acid modification of the thermoplastic resin (for example, a polyolefin resin). Examples of a compound used for graft modification of the thermoplastic resin (for example, a polyolefin resin) include unsaturated carboxylic acid derivative components derived from one of unsaturated carboxylic acids, acid anhydrides of unsaturated carboxylic acids, and esters of unsaturated carboxylic acids.

Examples of the unsaturated carboxylic acids include acrylic acid, methacrylic acid, maleic acid, fumaric acid, itaconic acid, and citraconic acid.

Examples of the acid anhydrides of unsaturated carboxylic acids include unsaturated carboxylic acid anhydrides such as maleic anhydride, itaconic anhydride, and citraconic anhydride.

Examples of the esters of unsaturated carboxylic acids include methyl acrylate, ethyl acrylate, methyl methacrylate, ethyl methacrylate, butyl methacrylate, dimethyl maleate, monomethyl maleate, dimethyl fumarate, diethyl fumarate, dimethyl itaconate, diethyl itaconate, dimethyl citraconate, diethyl citraconate, and dimethyl tetrahydrophthalic anhydride.

When the thermoplastic resin is a copolymer of an olefin monomer and a monomer having a polar moiety, the copolymer contains a structural unit derived from the monomer having a polar moiety in an amount of preferably 2% by mass or more, more preferably 4% by mass or more, still more preferably 5% by mass or more, still further more preferably 6% by mass or more. Moreover, the copolymer contains the structural unit derived from the monomer having a polar moiety in an amount of preferably 30% by mass or less, more preferably 25% by mass or less, still more preferably 20% by mass or less, particularly preferably 15% by mass or less.

When the copolymer contains the structural unit derived from the monomer having a polar moiety in an amount of 2% by mass or more, the adhesion strength of the high-frequency dielectric heating adhesive sheet is improved. When the copolymer contains the structural unit derived from the monomer having a polar moiety in an amount of 30% by mass or less, an excessive increase in the tackiness of the thermoplastic resin can be prevented. Therefore, the occurrence of difficulties during molding of the high-frequency dielectric heating adhesive sheet can be easily prevented.

When the polyolefin resin used as the thermoplastic resin includes the acid-modified structure, the rate of acid modification is preferably 0.01% by mass or more, more preferably 0.1% by mass or more, still more preferably by mass or more.

When the polyolefin resin used as the thermoplastic resin includes the acid-modified structure, the rate of acid modification is preferably 30% by mass or less, more preferably 20% by mass or less, still more preferably 10% by mass or less.

In the case where the thermoplastic resin includes the acid-modified structure, when the rate of acid modification is 0.01% by mass or more, the adhesion strength of the high-frequency dielectric heating adhesive sheet is improved. When the rate of acid modification is 30% by mass or less, an excessive increase in the tackiness of the thermoplastic resin can be prevented. Therefore, the occurrence of difficulties during molding of the high-frequency dielectric heating adhesive sheet can be easily prevented.

In the present description, the modification rate is the percentage of the mass of the moiety derived from the acid with respect to the total mass of the acid-modified polyolefin.

Maleic Anhydride-Modified Polyolefin

More preferably, the polyolefin resin used as the thermoplastic resin includes an acid anhydride structure as the acid-modified structure. The acid anhydride structure is preferably a structure introduced when the polyolefin resin is modified with maleic anhydride.

In the maleic anhydride-modified polyolefin, it is preferable that the rate of modification with maleic anhydride is in the same range as the range of the modification rate when the polyolefin resin used as the thermoplastic resin includes the acid-modified structure. The effects obtained when the modification rate is in this range are the same as those when the polyolefin resin used as the thermoplastic resin includes the acid-modified structure.

The structural unit derived from the olefin in the maleic anhydride-modified polyolefin is preferably a structural unit derived from ethylene or propylene. Specifically, the maleic anhydride-modified polyolefin is preferably a maleic anhydride-modified polyethylene resin or a maleic anhydride-modified polypropylene resin.

Olefin-Vinyl Acetate Copolymer Resin

It is also preferable that the thermoplastic resin according to the exemplary embodiment is a copolymer including a structural unit derived from an olefin and a structural unit derived from vinyl acetate (an olefin-vinyl acetate copolymer resin).

Preferably, the olefin-vinyl acetate copolymer resin used as the thermoplastic resin contains the structural unit derived from vinyl acetate within the same range as that for the structural unit derived from the monomer having a polar moiety when the thermoplastic resin is the copolymer of the olefin monomer and the monomer having a polar moiety. The effects obtained in the above range are the same as those when the thermoplastic resin is the copolymer of the olefin monomer and the monomer having a polar moiety.

The structural unit derived from an olefin in the olefin-vinyl acetate copolymer resin is preferably a structural unit derived from ethylene or propylene because high mechanical strength and stable bondability are obtained.

Therefore, the thermoplastic resin is preferably at least one of an ethylene-vinyl acetate copolymer resin or a propylene-vinyl acetate copolymer resin and more preferably an ethylene-vinyl acetate copolymer resin. The percentage (% by mass) of the structural unit derived from vinyl acetate in the ethylene-vinyl acetate copolymer resin and the propylene-vinyl acetate copolymer resin is also preferably within the same range as that described above for the olefin-vinyl acetate copolymer resin.

Styrene Resin

The styrene resin may be a homopolymer of a styrene monomer (polystyrene: PS). Examples of the styrene resin include a homopolymer of styrene, a homopolymer of α-methylstyrene, and a homopolymer of β-methylstyrene.

The PS may be a general-purpose polystyrene resin (GPPS resin) or a high-impact polystyrene resin (HIPS resin) containing the GPPS resin and a rubber elastic body.

The styrene resin is, for example, a resin obtained by copolymerization of a styrene monomer such as α-methylstyrene or β-methylstyrene and an aliphatic monomer and may be a hydrogenated styrene resin obtained by hydrogenating the above styrene resin.

The styrene resin is also preferably a styrene elastomer, Examples of the styrene elastomer include styrene-conjugated diene copolymers and styrene-olefin copolymers. Specific examples of the styrene-conjugated diene copolymers include: non-hydrogenated styrene-conjugated diene copolymers such as styrene-butadiene copolymers, styrene-butadiene-styrene (SBS) copolymers, styrene-butadiene/butylene-styrene copolymers, styrene-isoprene copolymers, styrene-isoprene-styrene (SIS) copolymers, and styrene-ethylene/isoprene-styrene copolymers: and hydrogenated styrene-conjugated diene copolymers such as styrene-ethylene/propylene-styrene (SEPS) copolymers and styrene-ethylene/butylene-styrene (SEBS) copolymers. Industrial examples of the styrene elastomer include trade names such as Tufprene (manufactured by Asahi Kasei Corporation), KRATON (manufactured by Kraton Polymers Japan Ltd.), Sumitomo TPE-SB (manufactured by Sumitomo Chemical Co., Ltd.), EPOFRIEND (manufactured by Daicel Corporation); RABALON (manufactured by Mitsubishi Chemical Corporation), SEPTON (manufactured by KURARAY Co., Ltd.), and TUFTEC (manufactured by Asahi Kasei Corporation). The styrene elastomer may be a hydrogenated product or a non-hydrogenated product.

Acrylic Resin

Preferably, the acrylic resin is a homopolymer of (meth) acrylate such as polymethyl methacrylate (PMMA) or polymethyl acrylate (PMA) or a copolymer of at least one of a monomer unit derived from methyl methacrylate (MMA) or a monomer unit derived from methyl acrylate (MA) with a monomer unit derived from at least one additional monomer. The acrylic resin may be one, or a mixture of two or more, selected from the group consisting of these homopolymer and copolymer. Herein, the term "(meth)acrylic acid" is a concept intended to encompass both "acrylic acid" and "methacrylic acid."

Examples of the additional monomer copolymerizable with at least one of MMA or MA include; alkyl (meth) acrylate including an alkyl group having 2 to 18 carbon atoms; α, β-unsaturated acids such as acrylic acid and methacrylic acid; unsaturated group-containing divalent carboxylic acids such as maleic acid, fumaric acid, and itaconic acid, and alkyl esters of the unsaturated group-containing divalent carboxylic acids; aromatic vinyl compounds such as styrene, α-methylstyrene, and nuclear-substituted styrenes; vinyl cyanide compounds such as acrylonitrile and methacrylonitrile; maleic anhydride; maleimide; and N-substituted maleimides. The additional monomer copolymerizable with at least one, or two or more, of MMA or MA may be at least one selected from the group consisting of these monomers.

In the high-frequency dielectric ting adhesive sheet according to the exemplary embodiment, it is preferable that an absolute value of a difference between a flow start temperature Tx1 of the first thermoplastic resin and a flow start temperature Tx2 of the second thermoplastic resin satisfies a relationship of the following numerical formula (Numerical Formula 4).

$|Tx1-Tx2| \leq 70$      (Numerical Formula 4)

The absolute difference |Tx1−Tx2| between the flow start temperatures Tx1 and Tx2 is more preferably 60 degrees C. or less, still more preferably 50 degrees C. or less, still further more preferably 40 degrees C. or less.

When the absolute difference |Tx1−Tx2| between the flow start temperatures Tx1 and Tx2 is 70 degrees C. or less, the high-frequency dielectric heating adhesive sheet according to the exemplary embodiment can be easily formed.

The flow start temperature of a thermoplastic resin can be measured using a method described later in Examples.

Dielectric Filler

The first dielectric filler and the second dielectric filler are each a filler that generates heat under application of a high-frequency wave.

Preferably, the first dielectric filler and the second dielectric filler are each a filler that generates heat under application of a high-frequency voltage in the frequency range from 3 MHz to 300 MHz. Preferably, the first dielectric filler and the second dielectric filler are each a filler that generates heat under application of a high-frequency voltage with a frequency of, for example, 13.56 MHz, 27.12 MHz, or 40.68 MHz in the frequency range from 3 MHz to 300 MHz.

Types

Preferably, the first dielectric filler and the second dielectric filler are each independently one or a combination of two or more of zinc oxide, silicon carbide (SiC), titanium oxide, barium titanate, barium titanate zirconate, lead titanate, potassium niobate, hydrated aluminum silicate, inorganic materials having crystal water such as hydrated aluminosilicates of alkali metals, and inorganic materials having crystal water such as hydrated aluminosilicates of alkaline earth metals. The type of first dielectric filler and the type of second dielectric filler are mutually the same or different.

Preferably, at least one of the first dielectric filler or the second dielectric filler is at least one selected from the group consisting of zinc oxide, silicon carbide, titanium oxide, and barium titanate.

Preferably, the first dielectric filler and the second dielectric filler are each independently at least one selected from the group consisting of zinc oxide, silicon carbide, titanium oxide, and barium titanate.

Among the dielectric fillers exemplified above, at least one of the first dielectric filler or the second dielectric filler is more preferably zinc oxide because there are variety of types of zinc oxide to allow a suitable one to be selected from zinc oxide fillers with different shapes and sizes, and because the bonding properties and mechanical properties of the high-frequency dielectric heating adhesive sheet can be improved according to its intended application. When zinc oxide is used as the dielectric fillers, a colorless high-frequency dielectric heating adhesive sheet can be obtained. Among the dielectric fillers, zinc oxide has a lower density. Therefore, when a high-frequency dielectric heating adhesive sheet containing zinc oxide as the dielectric fillers is used to bond adherends together, the total weight of the bonded body is unlikely to be increased as compared with when a sheet containing a dielectric filler other than zinc oxide is used. The hardness of zinc oxide is not excessively high as compared with those of other ceramics. Therefore, a device for manufacturing the high-frequency dielectric heating adhesive sheet is unlikely to be damaged. Zinc oxide is an inert oxide. Therefore, even when mixed with a thermoplastic resin, zinc oxide causes less damage to the thermoplastic resin.

Preferably, titanium oxide used as the dielectric fillers is at least one of anatase-type titanium oxide or rutile-type titanium oxide. Rutile-type titanium oxide is more preferred because of its good dielectric property.

The first dielectric filler and the second dielectric filler are mutually the same or different.

Volume Contents

At least one of the volume content of the first dielectric filler in the first bonding layer or the volume content of the second dielectric filler in the second bonding layer is preferably 5% by volume or more and more preferably 8% by volume or more.

At least one of the volume content of the first dielectric filler in the first bonding layer or the volume content of the second dielectric filler in the second bonding layer is preferably 50% by volume or less, more preferably 40% by volume or less, still more preferably 35% by volume or less.

When the volume content of the first dielectric filler is 5% by volume or more, it can be easy to firmly bond the first bonding layer and the first adherend together.

When the volume content of the second dielectric filler is 5% by volume or more, it can be easy to firmly bond the second bonding layer and the second adherend together.

When the volume content of the first dielectric filler is 50% by volume or less, the first bonding layer can be easily formed.

When the volume content of the second dielectric filler is 50% by volume or less, the second bonding layer can be easily formed.

When the volume content of the first dielectric filler and the volume content of the second dielectric filler are both 5% by volume or more, the high-frequency dielectric heating adhesive sheet according to the exemplary embodiment can firmly bond the first and second adherends made of different materials with ease.

When the volume content of the first dielectric filler and the volume content of the second dielectric filler are both 50% by volume or less, the first bonding layer and the second bonding layer can easily have high flexibility, and a reduction in toughness can be easily prevented. Therefore, the high-frequency dielectric heating adhesive sheet as a whole can easily have high flexibility, and a reduction in toughness can be easily prevented, so that the high-frequency dielectric heating adhesive sheet can be easily formed into a desired shape in a subsequent step.

The volume content of the first dielectric filler in the first bonding layer and the volume content of the second dielectric filler in the second bonding layer are mutually the same or different.

Volume Average Particle Sizes

At least one of the volume average particle size of the first dielectric filler or the volume average particle size of the second dielectric filler is preferably 1 μm or more, more preferably 2 μm or more, still more preferably 3 μm or more.

At least one of the volume average particle size of the first dielectric filler or the volume average particle size of the second dielectric filler is preferably 30 μm or less, more preferably 25 μm or less, still more preferably 20 μm or less.

When the volume average particle size of the first dielectric filler in the first bonding layer is 1 μm or more, the first bonding layer can exhibit high heat generation performance during application of a high-frequency wave.

When the volume average particle size of the first dielectric filler in the first bonding layer is 30 μm or less, a reduction in the strength of the first bonding layer can be prevented, and the first bonding layer can exhibit high heat generation performance during application of a high-frequency wave. When the volume average particle size of the second dielectric filler in the second bonding layer is 1 μm or more, the second bonding layer can exhibit high heat generation performance during application of a high-frequency wave.

When the volume average particle size of the second dielectric filler in the second bonding layer is 30 μm or less, a reduction in the strength of the second bonding layer can be prevented, and the second bonding layer can exhibit high heat generation performance during application of a high-frequency wave.

When the volume average particle size of the first dielectric filler and the volume average particle size of the second dielectric filler are both 1 μm or more, the high-frequency dielectric heating adhesive sheet according to the exemplary embodiment as a whole can exhibit high heat generation performance during application of a high-frequency wave, and can firmly bond the first adherend and the second adherend together in a shorter time.

When the volume average particle size of the first dielectric filler and the volume average particle size of the second dielectric filler are both 30 μm or less, a reduction in the strength of the high-frequency dielectric heating adhesive sheet can be prevented, and the adhesive sheet as a whole can exhibit high heat generation performance during application of a high-frequency wave.

The volume average particle size of the first dielectric filler and the volume average particle size of the second dielectric filler are mutually the same or different.

The volume average particle size of each dielectric filler can be measured by the following method. The particle size distribution of the dielectric filler is measured by a laser diffraction/scattering method, and the volume average particle size is calculated according to JIS Z 8819-2:2001 from the results of the particle size distribution measurement.

Additives

The high-frequency dielectric heating adhesive sheet according to the exemplary embodiment may contain an additive or may not contain an additive. When the high-frequency dielectric heating adhesive sheet according to the exemplary embodiment contains an additive, it is preferable that at least one of the first bonding layer or the second bonding layer contains the additive.

When the high-frequency dielectric heating adhesive sheet according to the exemplary embodiment contains an additive, examples of the additive include a tackifier, a plasticizer, a wax, a coloring agent, an antioxidant, an ultraviolet absorber, an antimicrobial agent, a coupling agent, a viscosity modifier, an organic filler, and an inorganic filler. The organic filler and the inorganic filler used as additives differ from the dielectric fillers.

The tackifier and the plasticizer can improve the fusion properties and bonding properties of the high-frequency dielectric heating adhesive sheet.

Examples of the tackifier include rosin derivatives, polyterpene resins, aromatic-modified terpene resins, hydrogenated products of aromatic-modified terpene resins, terpene phenol resins, coumarone-indene resins, aliphatic petroleum resins, aromatic petroleum resins, and hydrogenated products of aromatic petroleum resins.

Examples of the plasticizer include petroleum process oil, natural oil, dibasic acid dialkyl esters, and low-molecular weight liquid polymers, Examples of the petroleum process oil include paraffin process oil, naphthene process oil, and aromatic process oil, Examples of the natural oil include castor oil and tall oil. Examples of the dibasic acid dialkyl esters include dibutyl phthalate, dioctyl phthalate, and dibutyl adipate. Examples of the low-molecular weight liquid polymers include liquid polybutene and liquid polyisoprene.

When the high-frequency dielectric heating adhesive sheet according to the exemplary embodiment contains an additive, the content of the additive in each high-frequency dielectric heating adhesive sheet is generally preferably 0.01% by mass or more, more preferably 0.05% by mass or more, still more preferably 0.1% by mass or more based on the total mass of the high-frequency dielectric heating adhesive sheet. The content of the additive in the high-frequency dielectric heating adhesive sheet is preferably 20% by mass or less, more preferably 15% by mass or less, still more preferably 10% by mass or less.

Preferably, the high-frequency dielectric heating adhesive sheet according to the exemplary embodiment does not contain carbon or carbon compounds composed mainly of carbon (such as carbon black) and electrically conductive materials such as metals. The contents of the electrically conductive materials in each high-frequency dielectric heating adhesive sheet are each independently preferably 5% by mass or less, more preferably 1% by mass or less, still more preferably 0.1% by mass or less, still further more preferably 0% by mass based on the total mass of the high-frequency dielectric heating adhesive sheet.

When the content of the electrically conductive materials in each high-frequency dielectric heating adhesive sheet is 5% by mass or less, undesirable dielectric breakdown that occurs during dielectric heating and causes carbonization of the bonded portions and the adherends can be easily prevented.

In the high-frequency dielectric heating adhesive sheet according to the exemplary embodiment, at least one of the total mass of the thermoplastic resin and the dielectric filler in the first bonding layer with respect to the entire mass of the first bonding layer or the total mass of the thermoplastic resin and the dielectric filler in the second bonding layer with respect to the entire mass of the second bonding layer is preferably 80% by mass or more, more preferably 90% by mass or more, still more preferably 99% by mass or more.

The total mass of the thermoplastic resins and the dielectric fillers in the high-frequency dielectric heating adhesive sheet according to the exemplary embodiment with respect to the entire mass of the high-frequency dielectric heating adhesive sheet is preferably 80% by mass or more, more preferably 90% by mass or more, still more preferably 99% by mass or more, Properties and Forms of High-Frequency Dielectric Heating Adhesive Sheet Interlayer Adhesion Properties In each of the layers included in the high-frequency dielectric heating adhesive sheet according to the exemplary embodiment, after a cross-cut test according to JIS K5600-5-6:1999, the ratio of the number of grids that are not peeled off from and are adhering to a layer in contact with the each of the layers is preferably 50% or more, more preferably 80% or more, still more preferably 100%. When the interlayer adhesion properties are as described above, interlayer peeling between the layers in the sheet is unlikely to occur.

The ratio of the number of grids that are not peeled off from and are adhering to the layer in contact with the each of the layers after the cross-cut test is generally 100% or less.

For example, when the high-frequency dielectric heating adhesive sheet 1 includes the first bonding layer 10 and the second bonding layer 20 as shown in FIG. 1, the first bonding layer 10 is in contact with the second bonding layer 20. In this case, after the cross-cut test according to JIS K5600-5-6:1999, the ratio of the number of grids in the first bonding layer 10 that are not peeled off from and are adhering to the second bonding layer 20 and the ratio of the number of grids in the second bonding layer 20 that are not peeled off from and are adhering to the first bonding layer 10 are preferably 50% or more, more preferably 80% or more, still more preferably 100%.

Thickness of High-Frequency Dielectric Heating Adhesive Sheet

The thickness of the high-frequency dielectric heating adhesive sheet is preferably 10 μm or more, more preferably 30 μm or more, still more preferably 50 μm or more.

When the thickness of the high-frequency dielectric heating adhesive sheet is 10 μm or more, the absolute amount of the material that is contained in the sheet and generates heat under application of a high-frequency wave is not small, and therefore the sheet can easily generate heat.

The upper limit of the thickness of the high-frequency dielectric heating adhesive sheet is not particularly limited. As the thickness of the high-frequency dielectric heating adhesive sheet increases, the overall weight of a bonded body obtained by bonding the first adherend and the second adherend together also increases. Therefore, it is preferable that the high-frequency dielectric heating adhesive sheet has a thickness that does not cause any practical problem. In consideration of the practicality and formability of the high-frequency dielectric heating adhesive sheet, the thickness of the high-frequency dielectric heating adhesive sheet is preferably 2000 μm or less, more preferably 1000 μm or less, still more preferably 600 μm or less.

At least one of the thickness of the first bonding layer or the thickness of the second bonding layer is preferably 5 μm or more, more preferably 25 μm or more, still more preferably 50 μm or more, and it is further more preferable that both the thickness of the first bonding layer and the thickness of the second bonding layer are within the above range.

At least one of the thickness of the first bonding layer or the thickness of the second bonding layer is preferably 1000 μm or less, more preferably 500 μm or less, still more preferably 300 μm or less, and it is further more preferable that both the thickness of the first bonding layer and the thickness of the second bonding layer are within the above range.

When the thickness of the first bonding layer is 5 μm or more, the first bonding layer can be easily formed, and the heat generation performance of the first bonding layer under application of a high-frequency wave is improved.

When the thickness of the second bonding layer is 5 μm or more, the second bonding layer can be easily formed, and the heat generation performance of the second bonding layer under application of a high-frequency wave is improved.

When the thickness of the first bonding layer and the thickness of the second bonding layer are both 5 μm or more, the high-frequency dielectric heating adhesive sheet can be easily formed, and the heat generation performance of the high-frequency dielectric heating adhesive sheet under application of a high-frequency wave is improved.

When the thickness of the first bonding layer and the thickness of the second bonding layer are both 1000 μm or less, the weight of the high-frequency dielectric heating adhesive sheet is not excessively large.

The thickness of the first bonding layer and the thickness of the second bonding layer are mutually the same or different.

In the high-frequency dielectric heating adhesive sheet according to the exemplary embodiment, at least one of the ratio $T_1/D_{F1}$ of the thickness $T_1$ of the first adhesive sheet to the average particle size $D_{F1}$ of the first dielectric filler or the ratio $T_2/D_{F2}$ of the thickness $T_2$ of the second adhesive sheet to the average particle size $D_{F2}$ of the second dielectric filler is preferably 1 or more, more preferably 2 or more, still more preferably 3 or more, still further more preferably 5 or more.

At least one of the ratio $T_1/D_{F1}$ or the ratio $T_2/D_{F2}$ is preferably 2500 or less, preferably 2000 or less, preferably 1750 or less, more preferably 1000 or less, still more preferably 500 or less, still further more preferably 100 or less, yet still further more preferably 50 or less.

When the ratio $T_1/D_{F1}$ is 1 or more, a reduction in adhesion strength due to contact between the first dielectric filler and an adherend during bonding can be prevented.

When the ratio $T_2/D_{F2}$ is 1 or more, a reduction in adhesion strength due to contact between the second dielectric filler and an adherend during bonding can be prevented.

When the ratio $T_1/D_{F1}$ is 2500 or less, a load on a sheet manufacturing device during manufacturing of the first bonding layer can be reduced.

When the ratio $T_2/D_{F2}$ is 2500 or less, a load on the sheet manufacturing device during manufacturing of the second bonding layer can be reduced.

When the ratio $T_1/D_{F1}$ and the ratio $T_2/D_{F2}$ are both 1 or more, a reduction in adhesion strength due to contact between the dielectric filler and the adherends on both sides of the high-frequency dielectric heating adhesive sheet during bonding can be prevented.

When the ratio $T_1/D_{F1}$ and the ratio $T_2/D_{F2}$ are both 2500 or less, a load on the sheet manufacturing device during manufacturing of the high-frequency dielectric heating adhesive sheet can be reduced.

The ratio $T_1/D_{F1}$ and the ratio $T_2/D_{F2}$ are mutually the same or different.

Dielectric Property (tan δ/ε'r) of High-Frequency Dielectric Heating Adhesive Sheet The dielectric properties, i.e., a dielectric dissipation factor (tan δ) and a relative dielectric constant (ε'r), of the high-frequency dielectric heating adhesive sheet can be simply and accurately measured using an impedance material analyzer.

The dielectric property (tan δ/ε'r) of the high-frequency dielectric heating adhesive sheet is preferably 0.005 or more, more preferably 0.008 or more, still more preferably 0.01 or more. The dielectric property (tan δ/ε'r) of the high-frequency dielectric heating adhesive sheet is preferably 0.08 or less and more preferably 0.05 or less. The dielectric property (tan δ/ε'r) is a value obtained by dividing the dielectric dissipation factor (tan δ) measured using, for example, an impedance material device by the relative dielectric constant (ε'r) measured using, for example, the impedance material device.

When the dielectric property of the high-frequency dielectric heating adhesive sheet is 0.005 or more, such disadvantages that a predetermined amount of heat is not generated during dielectric heating, making it difficult to obtain firm bonding between the adherends due to insufficient heat generation can be avoided.

When the dielectric property of the high-frequency dielectric heating adhesive sheet is 0.08 or less, the adherends are unlikely to be damaged.

The details of the method for measuring the dielectric property of the high-frequency dielectric heating adhesive sheet are as follows. The high-frequency dielectric heating adhesive sheet is cut into a predetermined size, and a relative dielectric constant (ε'r) and a dielectric dissipation factor(tan δ) of the cut sheet are measured using an RF impedance material analyzer E4991A (manufactured by Agilent) under the conditions of 23 degrees C. and a frequency of 40.68 MHz. Then a value of the dielectric property (tan δ/ε'r) is calculated.

Method for Producing High-Frequency Dielectric Heating Adhesive Sheet

The method for producing the high-frequency dielectric heating adhesive sheet according to the exemplary embodiment is not particularly limited as long as a stacked-type high-frequency dielectric heating adhesive sheet including the first bonding layer and the second bonding layer can be produced.

The high-frequency dielectric heating adhesive sheet according to the exemplary embodiment can be produced, for example, by pre-mixing the components described above and subjecting the mixture to co-extrusion using a multilayer extruder. The high-frequency dielectric heating adhesive sheet according to the exemplary embodiment can also be produced by separately producing single-layer sheets for the layers (e.g., the first bonding layer and the second bonding layer) forming the high-frequency dielectric heating adhesive sheet according to the exemplary embodiment and subjecting the single-layer sheets to lamination to stack these sheets. The single-layer sheets can be produced by pre-mixing the components described above, kneading the mixture using a well-known kneader such as an extruder or a heat rolling mill, subjecting the resulting mixture to a well-known molding method such as extrusion molding, calendaring, injection molding, or cast molding. When the single-layer sheets are subjected to lamination, a thermal laminator, for example, is used.

Method for Using High-Frequency Dielectric Heating Adhesive Sheet

By using the high-frequency dielectric heating adhesive sheet according to the exemplary embodiment, the first adherend and the second adherend can be bonded together.

Preferably, the high-frequency dielectric heating adhesive sheet according to the exemplary embodiment is a sheet for bonding together the first adherend and the second adherend made of a material different from the material of the first adherend.

Preferably, the first adherend contains a third thermoplastic resin, and a main component of the first thermoplastic resin contained in the first bonding layer is the same as a main component of the third thermoplastic resin. Preferably, the first bonding layer is bonded to the first adherend.

Preferably, the second adherend contains a fourth thermoplastic resin, and a main component of the second thermoplastic resin contained in the second bonding layer is the same as a main component of the fourth thermoplastic resin. Preferably, the second bonding layer is bonded to the second adherend.

Preferably, the third thermoplastic resin and the fourth thermoplastic resin are each independently a resin appropriately selected from the thermoplastic resins described for the first bonding layer and the second bonding layer.

Herein, when the thermoplastic resin is, for example, a polymer containing different repeating units, the "main component of a thermoplastic resin" means one of the repeating units with the largest content in the polymer. When the thermoplastic resin is a polymer derived from a single monomer, this monomer unit (repeating unit) is the "main component of the thermoplastic resin." When the thermoplastic resin is a copolymer containing different repeating units, one of the repeating units with the largest content in the polymer is the "main component of the thermoplastic resin." When the thermoplastic resin is a copolymer, the "main component of the thermoplastic resin" of the copolymer is a repeating unit (monomer unit) contained in an amount of 30% by mass or more. In an exemplary embodiment, the "main component" is a repeating unit contained in an amount of more than 30% by mass. In another exemplary embodiment, the "main component" is a repeating unit contained in an amount of 40% by mass or more. In still another exemplary embodiment, the "main component" is a repeating unit contained in an amount of 50% by mass or more. When the thermoplastic resin is a copolymer, the number of repeating units with the largest content may be two or more.

When, for example, the first thermoplastic resin is an ethylene-vinyl acetate copolymer containing 50% by mass or more of an ethylene unit as a repeating unit and the third thermoplastic resin is also an ethylene-vinyl acetate copolymer containing 50% by mass or more of an ethylene unit as a repeating unit, the main component (repeating unit) of the first thermoplastic resin and the main component (repeating unit) of the third thermoplastic resin are both ethylene, and the main component of the first thermoplastic resin and the main component of the third thermoplastic resin are the same.

When, for example, the first thermoplastic resin is a maleic anhydride-modified polypropylene containing 50% by mass or more of a propylene unit as a repeating unit and the third thermoplastic resin is polypropylene, the main component (repeating unit) of the first thermoplastic resin and the main component (repeating unit) of the third thermoplastic resin are both propylene, and the main component of the first thermoplastic resin and the main component of the third thermoplastic resin are the same.

For a thermoplastic resin composed of a homopolymer, the repeating unit forming the polymer is the main component of the thermoplastic resin. For example, when the first thermoplastic resin is polyethylene and the third thermoplastic resin is also polyethylene, the main component (repeating unit) of the first thermoplastic resin and the main component (repeating unit) of the third thermoplastic resin are both ethylene, and the main component of the first thermoplastic resin and the main component of the third thermoplastic resin are the same.

The same can apply to the "main component of the thermoplastic resin" in the second thermoplastic resin and that in the fourth thermoplastic resin.

Examples of the combination of the first thermoplastic resin and the third thermoplastic resin and the combination of the second thermoplastic resin and the fourth thermoplastic resin include the following combinations.

(R1) polyethylene and ethylene-vinyl acetate copolymer
(R2) polyethylene and EMAA (ethylene-methyl methacrylate copolymer)
(R3) polyethylene and EMA (ethylene-methacrylate copolymer)
(R4) polyethylene and ethylene cycloolefin copolymer
(R5) polypropylene and modified polypropylene
(R6) PS and SEBS
(R7) PS and SBR (styrene-butadiene rubber)
(R8) PS and SEES (styrene-ethylene-ethylene-styrene block copolymer)
(R9) PS and ABS (acrylonitrile-butadiene-styrene copolymer)
(R10) PS and SIS Preferably, a surface of the first adherend that is in direct contact with the first bonding layer of the high-frequency dielectric heating adhesive sheet is formed of the third thermoplastic resin. It is also preferable that the entire first adherend is formed of the third thermoplastic resin. When the first adherend has a multilayer structure, it is also preferable that a layer of the first adherend that is located at the outermost position (the outermost layer of the first adherend) is formed of the third thermoplastic resin. When the entire first adherend or the outermost layer of the first adherend is formed of a resin blend prepared by mixing a plurality of resins, a volume content of the third thermoplastic resin in the entire first adherend or the outermost layer of the first adherend is preferably 50% by volume or more, more preferably 60% by volume or more, still more preferably 70% by volume or more, still further more preferably 80% by volume or more, yet still further more preferably 90% by volume or more.

Preferably, a surface of the second adherend that is in direct contact with the second bonding layer of the high-frequency dielectric heating adhesive sheet is formed of the fourth thermoplastic resin. It is also preferable that the entire second adherend is formed of the fourth thermoplastic resin. When the second adherend has a multilayer structure, it is also preferable that a layer of the second adherend that is located at the outermost position (the outermost layer of the second adherend) is formed of the fourth thermoplastic resin. When the entire second adherend or the outermost layer of the second adherend is formed of a resin blend prepared by mixing a plurality of resins, a volume content of the fourth thermoplastic resin in the entire second adherend or the outermost layer of the second adherend is preferably 50% by volume or more, more preferably 60% by volume or more, still more preferably 70% by volume or more, still further more preferably 80% by volume or more, yet still further more preferably 90% by volume or more.

The shape of the first adherend and the shape of the second adherend are not particularly limited, but it is preferable that the first and second adherends have a sheet shape. The shape of the first adherend and the second adherend may be formed of any of the materials described above, and the shape of the first adherend may be the same as or different from the shape and size of the second adherend.

In a method for using the high-frequency dielectric heating adhesive sheet according to the exemplary embodiment, the high-frequency dielectric heating adhesive sheet according to the exemplary embodiment is held between the first adherend and the second adherend, and a high-frequency voltage of, for example, from 3 MHz to 300 MHz is applied. A bonded body including the first adherend and the second adherend bonded together can thereby be produced.

Bonding Method

A bonding method according to the exemplary embodiment uses the high-frequency dielectric heating adhesive sheet according to the exemplary embodiment to bond the first adherend and the second adherend together.

Preferably, the bonding method according to the exemplary embodiment includes the following steps P1 and P2.

Step P1: bringing the first bonding layer of the high-frequency dielectric heating adhesive sheet into contact with the first adherend and bringing the second bonding layer into contact with the second adherend.

Step P2: applying a high-frequency wave to the high-frequency dielectric heating adhesive sheet to bond the first adherend and the second adherend together.

Step P1

Step P1 is a step of holding the high-frequency dielectric heating adhesive sheet according to the exemplary embodiment between the first adherend and the second adherend. In step P1, the first adherend is brought into contact with the first bonding layer of the high-frequency dielectric heating adhesive sheet. In step P1, the second adherend is brought into contact with the second bonding layer of the high-frequency dielectric heating adhesive sheet.

It is only necessary that the high-frequency dielectric heating adhesive sheet be held between the first adherend and the second adherend such that the first adherend and the second adherend can be bonded together through the high-frequency dielectric heating adhesive sheet. The high-frequency dielectric heating adhesive sheet may be held between a part of the first adherend and a part of the second adherend at a plurality of points or between the first and second adherends over the entire bonding surfaces. From the viewpoint of improving the adhesion strength between the first adherend and the second adherend, it is preferable that the high-frequency dielectric heating adhesive sheet is held between the first adherend and the second adherend over the entire bonding surfaces. Examples of the embodiment in which the high-frequency dielectric heating adhesive sheet is held between a part of the first adherend and a part of the second adherend include the embodiment in which a frame-shaped high-frequency dielectric heating adhesive sheet is disposed along the outer circumferences of the bonding surfaces of the first adherend and the second adherend and held between the first adherend and the second adherend. When the frame-shaped high-frequency dielectric heating adhesive sheet is disposed as described above, while the adhesion strength between the first adherend and the second adherend is ensured, the weight of the bonded body can be reduced as compared with that when the high-frequency dielectric heating adhesive sheet is disposed over the entire bonding surfaces. In the embodiment in which the high-frequency dielectric heating adhesive sheet is disposed between a part of the first adherend and a part of the second adherend, the size of the high-frequency dielectric heating adhesive sheet used can be reduced. Therefore, the time for high-frequency dielectric heating can be shorter than that when the high-frequency dielectric heating adhesive sheet is disposed over the entire bonding surfaces.

Step P2

Step P2 is a step of applying a high-frequency voltage in a range from 3 MHz to 300 MHz to the high-frequency dielectric heating adhesive sheet held between the first adherend and the second adherend in step P1 to thereby bond the first adherend and the second adherend together using the high-frequency dielectric heating adhesive sheet.

For example, by using a dielectric heating adhesion device, a high-frequency voltage can be applied to the high-frequency dielectric heating adhesive sheet.

Figure 2:
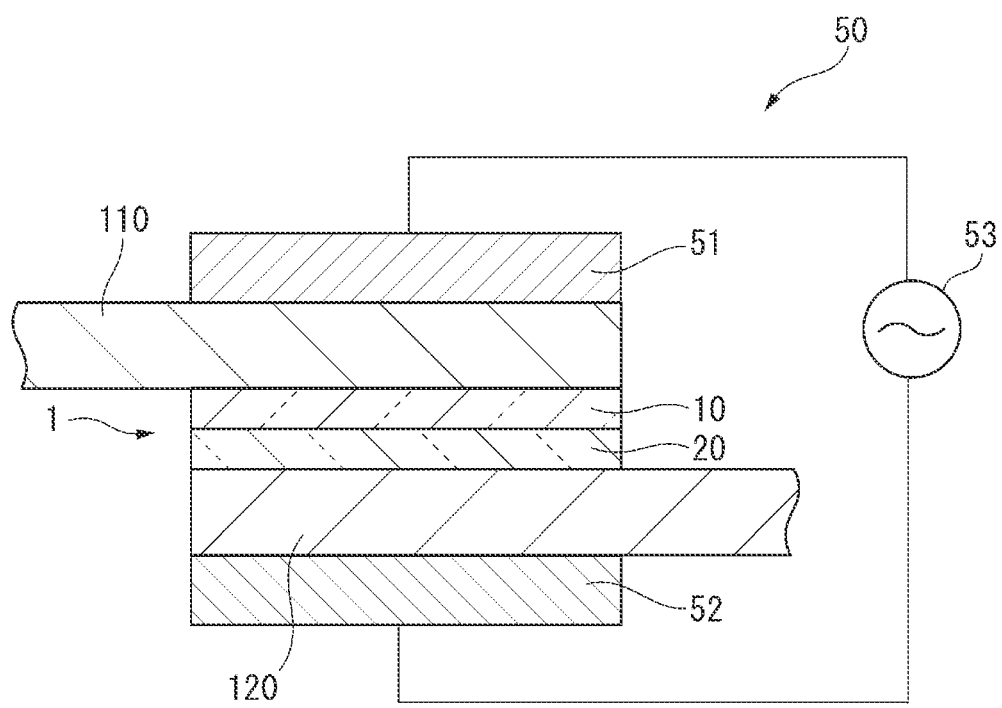
FIG. 2 is a schematic illustration for describing high-frequency dielectric heating using the high-frequency dielectric heating adhesive sheet according to the first exemplary embodiment and a dielectric heating device.

FIG. 2 shows a schematic illustration for describing the high-frequency dielectric heating using the high-frequency dielectric heating adhesive sheet according to the exemplary embodiment and the dielectric heating device.

Dielectric Heating Adhesion Device

FIG. 2 shows a schematic illustration of a dielectric heating adhesion device 50.

The dielectric heating adhesion device 50 includes a first high-frequency electrode 51, a second high-frequency electrode 52, and a high-frequency power source 53.

The first high-frequency electrode 51 and the second high-frequency electrode 52 are disposed so as to face each other. The first high-frequency electrode 51 and the second high-frequency electrode 52 each include a press mechanism. The press mechanisms allow the first adherend 110, the high-frequency dielectric heating adhesive sheet 1, and the second adherend 120 to be subjected to press treatment between the first high-frequency electrode 51 and the second high-frequency electrode 52.

When the first high-frequency electrode 51 and the second high-frequency electrode 52 form a pair of parallel flat electrodes, this electrode arrangement may be referred to as a parallel flat-plate type.

It is also preferable that a high-frequency dielectric heater of the parallel flat-plate type is used to apply a high-frequency wave. With the high-frequency dielectric heater of the parallel flat-plate type, the high-frequency wave passes through the high-frequency dielectric heating adhesive sheet located between the electrodes. Therefore, the entire high-frequency dielectric heating adhesive sheet can be heated, and the adherends and the high-frequency dielectric heating adhesive sheet can be bonded together in a short time.

The high-frequency power source 53 is connected to the first high-frequency electrode 51 and the second high-frequency electrode 52 and used to apply thereto a high-frequency voltage with a frequency of, for example, about 13.56 MHz, about 27.12 MHz, or about 40.68 MHz.

As shown in FIG. 2, the dielectric heating adhesion device 50 subjects the first adherend 110 and the second adherend 120 to dielectric heating through the high-frequency dielectric heating adhesive sheet 1 held between the first adherend 110 and the second adherend 120. Moreover, the dielectric heating adhesion device 50 performs, in addition to the dielectric heating, pressurizing treatment using the first high-frequency electrode 51 and the second high-frequency electrode 52 to thereby bond the first adherend 110 and the second adherend 120 together. The first adherend 110 and the second adherend 120 may be bonded together without the pressurizing treatment.

When a high-frequency electric field is applied between the first high-frequency electrode 51 and the second high-frequency electrode 52, dielectric fillers (not shown) dispersed in the first bonding layer and the second bonding layer in the high-frequency dielectric heating adhesive sheet 1 absorb the high-frequency energy.

The dielectric fillers function as heat sources, and the heat generated by the dielectric fillers causes the thermoplastic resin components in the first bonding layer and the second bonding layer to melt. This allows the first adherend 110 and the second adherend 120 to be finally bonded together firmly even when the treatment time is short.

The first high-frequency electrode 51 and the second high-frequency electrode 52 have the press mechanisms and therefore function also as a pressing device. Therefore, while the first adherend 110 and the second adherend 120 are pressed in a compression direction by the first high-frequency electrode 51 and the second high-frequency electrode 52, the high-frequency dielectric heating adhesive sheet 1 is heated and melted, so that the first adherend 110 and the second adherend 120 can be more firmly bonded together.

High-Frequency Dielectric Heating Adhesion Conditions

The high-frequency dielectric heating adhesion conditions may be changed as needed but are preferably as follows.

A high-frequency output is preferably 10 W or more, more preferably 30 W or more, still more preferably 50 W or more, still further more preferably 80 W or more.

The high-frequency output is preferably 50,000 W or less, more preferably 20,000 W or less, still more preferably 15,000 W or less, still further more preferably 10,000 W or less, yet still further more preferably 1,000 W or less.

When the high-frequency output is 10 W or more, it is possible to avoid a disadvantage that the temperature is not easily increased during dielectric heating, so that a favorable adhesive force can be easily obtained.

When the high-frequency output is 50,000 W or less, it can be easy to avoid a disadvantage that temperature control during dielectric heating is difficult.

The application time of the high-frequency wave is preferably 1 second or more.

The application time of the high-frequency wave is preferably 60 seconds or less, more preferably 45 seconds or less, still more preferably 35 seconds or less, still further more preferably 25 seconds or less, yet still further more preferably 10 seconds or less.

When the application time of the high-frequency wave is 1 second or more, it is possible to avoid a disadvantage that the temperature is not easily increased during dielectric heating, so that a favorable adhesive force can be easily obtained.

When the application time of the high-frequency wave is 60 seconds or less, disadvantage s such as a reduction in the efficiency of producing the bonded body including the first adherend and the second adherend bonded together, an increase in the production cost of the bonded body, and thermal deterioration of the adherends can be easily prevented.

The frequency of the high-frequency wave applied is preferably 1 kHz or more, more preferably 1 MHz or more, still more preferably 5 MHz or more, still further more preferably 10 MHz or more.

The frequency of the high-frequency wave applied is preferably 300 MHz or less, more preferably 100 MHz or less, still more preferably 80 MHz or less, still further more preferably 50 MHz or less. Specifically, any of 13.56 MHz, 27.12 MHz, and 40.68 MHz, which are industrial frequency bands allocated by the International Telecommunication Union, is used for the high-frequency dielectric heating adhesion method (bonding method) of the exemplary embodiment.

The high-frequency dielectric heating adhesive sheet according to the exemplary embodiment has a multilayer structure including the first and second bonding layers serving as the outermost layers. The first bonding layer and the second bonding layer satisfy the relationships indicating that the change rates Vx1 and Vx2 represented by the above numerical formulas (Numerical Formula 1) and (Numerical Formula 2) are less than 80%. Therefore, the high-frequency dielectric heating adhesive sheet according to the exemplary embodiment can firmly bond the first and second adherends made of different materials. The high-frequency dielectric heating adhesive sheet according to the exemplary embodiment is unlikely to undergo interlayer peeling.

The high-frequency dielectric heating adhesive sheet according to the exemplary embodiment can be handled more easily than when using an adhesive that needs to be applied, and the workability during bonding of the first adherend and the second adherend is also improved. The high-frequency dielectric heating adhesive sheet according to the exemplary embodiment can be bonded to the adherends under application of a high-frequency wave in a shorter time.

The high-frequency dielectric heating adhesive sheet according to the exemplary embodiment has higher water resistance and moisture resistance than general adhesives.

The high-frequency dielectric heating adhesive sheet according to the exemplary embodiment contains no solvent. Therefore, a disadvantage with VOC (Volatile Organic Compounds) caused by an adhesive used to bond adherends is unlikely to occur.

The high-frequency dielectric heating adhesive sheet according to the exemplary embodiment is heated by applying a high-frequency voltage, so that the high-frequency dielectric heating adhesive sheet is heated locally. Therefore, with the high-frequency dielectric heating adhesive sheet according to the exemplary embodiment, it can be easy to avoid a disadvantage that the entire adherends are melted when the adherends are bonded together.

With the bonding method using the high-frequency dielectric heating adhesive sheet according to the exemplary embodiment, only predetermined portions can be heated locally from the outside using the dielectric heating adhesion device. Therefore, even when the adherends are large three-dimensional structures having complicated shapes or thick three-dimensional structures having complicated shapes and high dimensional accuracy is required, the bonding method using the high-frequency dielectric heating adhesive sheet according to the exemplary embodiment is effective.

In the high-frequency dielectric heating adhesive sheet according to the exemplary embodiment, the thicknesses and the like of the high-frequency dielectric heating adhesive sheet can be appropriately controlled. Therefore, the high-frequency dielectric heating adhesive sheet according to the exemplary embodiment is applicable to a roll-to-roll method. Moreover, the high-frequency dielectric heating adhesive sheet can be, for example, stamped into any shape with any area according to the contact area between the sheets and the adherends and the shapes of the adherends. Therefore, the high-frequency dielectric heating adhesive sheet according to the exemplary embodiment is significantly advantageous also from the viewpoint of its manufacturing process.

Second Exemplary Embodiment

High-Frequency Dielectric Heating Adhesive Sheet

The high-frequency dielectric heating adhesive sheet in a second exemplary embodiment further includes an intermediate layer disposed between the first bonding layer and the second bonding layer. The high-frequency dielectric heating adhesive sheet according to the exemplary embodiment differs from the high-frequency dielectric heating adhesive sheet in the first exemplary embodiment in that the intermediate layer is provided and is the same as the high-frequency dielectric heating adhesive sheet in the first exemplary embodiment in terms of other features. Therefore, in the following description, differences from the first exemplary embodiment will be mainly described, and redundant description will be omitted or simplified. The same components as those in the first exemplary embodiment will be denoted by the same symbols, and their description will be omitted or simplified, Intermediate Layer In the high-frequency dielectric heating adhesive sheet according to the exemplary embodiment, the intermediate layer contains preferably one or a plurality of thermoplastic resins and contains more preferably the first thermoplastic resin and the second thermoplastic resin.

In the high-frequency dielectric heating adhesive sheet according to the exemplary embodiment, it is preferable that the first bonding layer is in direct contact with the intermediate layer and that the second bonding layer is in direct contact with the intermediate layer.

In the high-frequency dielectric heating adhesive sheet according to the exemplary embodiment, when the first bonding layer is in direct contact with the intermediate layer and the second bonding layer is in direct contact with the intermediate layer, the meanings of the symbols in the above numerical formulas (Numerical Formula 1) and (Numerical Formula 2) are as follows.

- VA1: the volume content of the first thermoplastic resin with respect to the total volume of all thermoplastic resins in the first bonding layer.
- VB11 the volume content of the first thermoplastic resin with respect to the total volume of all thermoplastic resins in the intermediate layer.
- VA2: the volume content of the second thermoplastic resin with respect to the total volume of all thermoplastic resins in the second bonding layer.
- VB2: the volume content of the second thermoplastic resin with respect to the total volume of all the thermoplastic resins in the intermediate layer.

According to the exemplary embodiment also, it is preferable that the first bonding layer, the intermediate layer, and the second bonding layer satisfy the relationships for the change rates Vx1 and Vx2 that are the same as those in the first exemplary embodiment.

Figure 3:
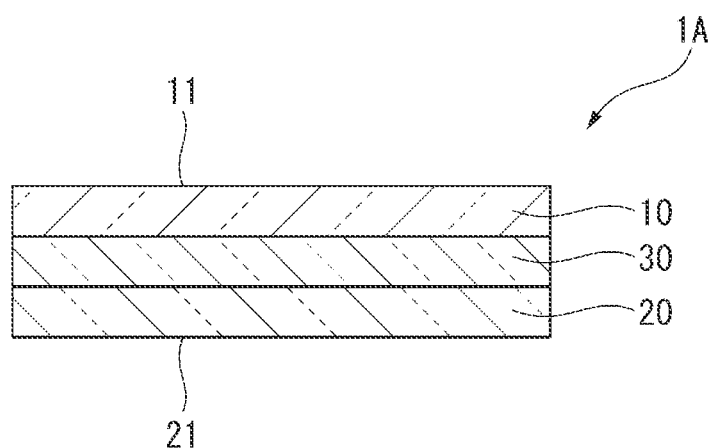
FIG. 3 is a schematic illustration of a high-frequency dielectric heating adhesive sheet according to a second exemplary embodiment.

FIG. 3 shows a schematic cross-sectional view of an example of the high-frequency dielectric heating adhesive sheet according to the exemplary embodiment. A high-frequency dielectric heating adhesive sheet 1A shown in FIG. 3 includes the first bonding layer 10 serving as an outermost layer and the second bonding layer 20 serving as an outermost layer and located on the side opposite to the first bonding layer 10. The high-frequency dielectric heating adhesive sheet 1A further includes the intermediate layer 30 between the first bonding layer 10 and the second bonding layer. In the high-frequency dielectric heating adhesive sheet 1A, the first bonding layer 10 is in direct contact with the intermediate layer 30, and the second bonding layer 20 is in direct contact with the intermediate layer 30.

In the high-frequency dielectric heating adhesive sheet according to the exemplary embodiment, it is preferable that the intermediate layer contains a third dielectric filler that generates heat under application of a high-frequency wave. When the intermediate layer contains the third dielectric filler, the intermediate layer is also heated when a high-frequency voltage is applied thereto, so that the first and second bonding layers in contact with the intermediate layer can be easily melted in a short time. Therefore, with the high-frequency dielectric heating adhesive sheet according to the exemplary embodiment, the first adherend and the second adherend can be firmly bonded together in a shorter time.

The third dielectric filler used may be the same dielectric filler as the first dielectric filler and the second dielectric filler described in the first exemplary embodiment. The third dielectric filler may be the same as or different from the first dielectric filler. The third dielectric filler may be the same as or different from the second dielectric filler.

Preferably, the first dielectric filler, the second dielectric filler, and the third dielectric filler are each independently at least one selected from the group consisting of zinc oxide, silicon carbide, titanium oxide, and barium titanate.

The first dielectric filler, the second dielectric filler, and the third dielectric filler are preferably the same dielectric filler and are more preferably zinc oxide.

A volume average particle size and a volume content of the third dielectric filler may be the same as or different from the volume average particle size and volume content of the first dielectric filler. The volume average particle size and volume content of the third dielectric filler may be the same as or different from the volume average particle size and volume content of the second dielectric filler.

It is also preferable that the intermediate layer does not contain the third dielectric filler that generates heat under application of a high-frequency wave. When the intermediate layer does not contain the third dielectric filler, the intermediate layer does not generate heat when a high-frequency voltage is applied thereto, so that the first bonding layer, the intermediate layer, and the second bonding layer are not melted excessively and are easily prevented from protruding from the bonding surfaces between the adherends. When the intermediate layer does not contain the dielectric filler, the own weight of the high-frequency dielectric heating adhesive sheet is small, so that the sheet can be handled with ease.

According to the exemplary embodiment also, in each of the layers included in the high-frequency dielectric heating adhesive sheet 1A, after a cross-cut test according to JIS K5600-5-6:1999, the ratio of the number of grids that are not peeled off from and are adhering to a layer in contact with the each of the layers is preferably 50% or more, more preferably 80% or more, still more preferably 100%.

For example, when the high-frequency dielectric heating adhesive sheet 1A includes the first bonding layer 10, the intermediate layer 30, and the second bonding layer 20 as shown in FIG. 3, the first bonding layer is in contact with the intermediate layer 30, and the second bonding layer is in contact with the intermediate layer 30. In this case, after the cross-cut test according to JIS K5600-5-6:1999, the ratio of the number of grids in the first bonding layer that are not peeled off from and are adhering to the intermediate layer 30 is preferably 50% or more, and the ratio of the number of grids in the second bonding layer that are not peeled off from and are adhering to the intermediate layer 30 is preferably 50% or more.

The high-frequency dielectric heating adhesive sheet according to the exemplary embodiment may contain an additive or may not contain an additive. When the high-frequency dielectric heating adhesive sheet according to the exemplary embodiment contains an additive, it is preferable that at least one of the first bonding layer, the intermediate layer, or the second bonding layer contains the additive. For example, the same additives as those described in the first exemplary embodiment can also be used for the high-frequency dielectric heating adhesive sheet according to the exemplary embodiment.

In the high-frequency dielectric heating adhesive sheet according to the exemplary embodiment also, it is preferable that the ratio $T_1/D_{F1}$ of the thickness $T_1$ of the first bonding layer to the average particle size $D_{F1}$ of the first dielectric filler satisfies the same relationship as that in the first exemplary embodiment.

In the high-frequency dielectric heating adhesive sheet according to the exemplary embodiment also, it is preferable that the ratio $T_2/D_{F2}$ of the thickness $T_2$ of the second bonding layer to the average particle size $D_{F2}$ of the second dielectric filler satisfies the same relationship as that in the first exemplary embodiment.

Thickness of High-Frequency Dielectric Heating Adhesive Sheet

According to the exemplary embodiment also, the thickness of the high-frequency dielectric heating adhesive sheet is preferably 10 μm or more, more preferably 30 μm or more, still more preferably 50 μm or more.

In the high-frequency dielectric heating adhesive sheet according to the exemplary embodiment also, it is preferable that the thickness of the first bonding layer and the thickness of the second bonding layer are each independently within the thickness range described in the first exemplary embodiment.

The thickness of the intermediate layer is preferably 5 μm or more, more preferably 25 μm or more, still more preferably 50 μm or more.

The thickness of the intermediate layer is preferably 1000 μm or less, more preferably 500 μm or less, still more preferably 300 μm or less.

When the thickness of the intermediate layer is 5 μm or more, the high-frequency dielectric heating adhesive sheet can be easily formed.

When the thickness of the intermediate layer is 1000 μm or les the weight of the high-frequency dielectric heating adhesive sheet is not excessively large.

Method for Producing High-Frequency Dielectric Heating Adhesive Sheet

The method for producing the high-frequency dielectric heating adhesive sheet according to the exemplary embodiment is not particularly limited as long as a stacked-type high-frequency dielectric heating adhesive sheet including the first bonding layer, the intermediate layer, and the second bonding layer can be produced. For example, the high-frequency dielectric heating adhesive sheet according to the exemplary embodiment can be produced by a method similar to that in the first exemplary embodiment.

Method for Using High-Frequency Dielectric Heating Adhesive Sheet

By using the high-frequency dielectric heating adhesive sheet according to the exemplary embodiment also, the first adherend and the second adherend can be bonded together. The main components of the thermoplastic resin in the adherends and the main components of the thermoplastic resins in the bonding layer are the same, as in the first exemplary embodiment.

Bonding Method

A bonding method according to the exemplary embodiment is a method for boding the first adherend and the second adherend together using the high-frequency dielectric heating adhesive sheet according to the exemplary embodiment. In the bonding method according to the exemplary embodiment, the high-frequency dielectric heating adhesive sheet according to the exemplary embodiment is used instead of the high-frequency dielectric heating adhesive sheet in the first exemplary embodiment. Moreover, it is preferable that the bonding method according to the exemplary embodiment includes the steps P1 and P2 described in the first exemplary embodiment.

Figure 4:
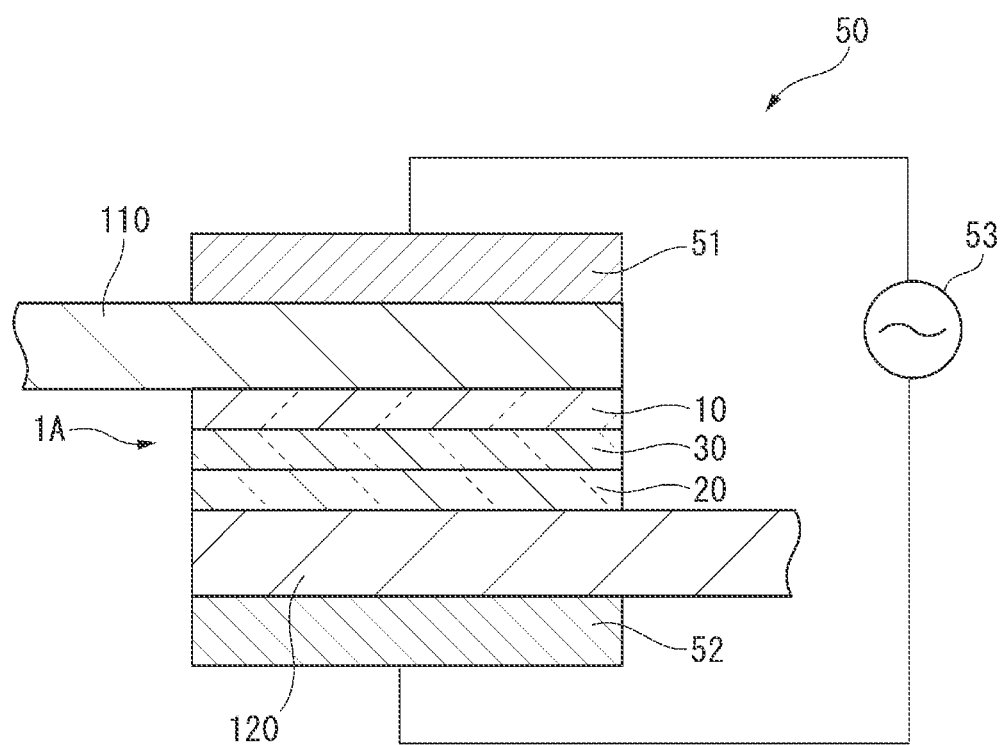
FIG. 4 is a schematic illustration for describing high-frequency dielectric heating using the high-frequency dielectric heating adhesive sheet according to the second exemplary embodiment and a dielectric heating device.

FIG. 4 shows a schematic illustration for describing the method for bonding the first adherend 110 and the second adherend 120 together using the dielectric heating adhesion device 50 and the high-frequency dielectric heating adhesive sheet 1A.

The high-frequency dielectric heating adhesion conditions may be changed appropriately but are preferably the same as those described in the first exemplary embodiment.

The high-frequency dielectric heating adhesive sheet according to the exemplary embodiment also has a multilayer structure including the first bonding layer and the second bonding layer as the outermost layers. Moreover, in the compositions of the first bonding layer, the intermediate layer, and the second bonding layer, the change rates Vx1 and Vx2 represented by the numerical formulas (Numerical Formula 1) and (Numerical Formula 2) are both less than 80%. Therefore, also with the high-frequency dielectric heating adhesive sheet according to the exemplary embodiment, the first adherend and the second adherend can be firmly bonded together. Moreover, the high-frequency dielectric heating adhesive sheet is unlikely to undergo interlayer peeling.

Modifications of Exemplary Embodiments

The invention is not limited to the above exemplary embodiments. The invention may include modifications and improvements as long as an object of the invention can be achieved.

In the examples described in the above exemplary embodiments, the high-frequency dielectric heating adhesive sheet consisting of two layer, i.e., the first bonding layer and the second bonding layer, or the high-frequency dielectric heating adhesive sheet consisting of three layers, i.e., the first bonding layer, the intermediate layer, and the second bonding layer, is used, but the invention is not limited to these examples. For example, in an exemplary embodiment of the invention, a high-frequency dielectric heating adhesive sheet including a total of four or more layers including the first bonding layer and the second bonding layer as the outermost layers is used.

The high-frequency dielectric heating adhesive sheet may have an adhesive portion. When the high-frequency dielectric heating adhesive sheet has the adhesive portion, positional displacement of the high-frequency dielectric heating adhesive sheet when being disposed between the adherends can be prevented, and the adhesive sheet can be disposed at a correct position. The adhesive portion may be disposed on one side of the high-frequency dielectric heating adhesive sheet or on both sides. The adhesive portion may be disposed on a part of the surfaces of the high-frequency dielectric heating adhesive sheet, Even when the high-frequency dielectric heating adhesive sheet has no adhesive portions, the adhesive sheet can firmly bond the first adherend and the second adherend together.

The high-frequency dielectric heating is not limited to the treatment performed using the dielectric heating adhesion device described in the above exemplary embodiments and including the electrodes disposed so as to face each other, and a lattice electrode-type high-frequency dielectric heater may be used. The lattice electrode-type high-frequency dielectric heater includes a lattice electrode including first polarity electrodes and second polarity electrodes having a polarity opposite to the polarity of the first polarity electrodes, the first polarity electrodes and the second polarity electrodes being arranged alternately at regular intervals on the same plane.

When, for example, a bonded body including a first adherend and a second adherend bonded together with their edges stacked together is produced, the lattice electrode-type high-frequency dielectric heater is disposed closer to the first adherend or the second adherend, and then a high-frequency wave is applied.

When the lattice electrode-type high-frequency dielectric heater is used to bond the first adherend and the second adherend together, a first lattice electrode may be disposed close to the first adherend, and a second lattice electrode may be disposed close to the second adherend. Then a high-frequency wave may be applied with the first adherend, the high-frequency dielectric heating adhesive sheet, and the second adherend held between the first lattice electrode and the second lattice electrode.

When the lattice electrode-type high-frequency dielectric heater is used to bond the first adherend and the second adherend together, the following procedure may be used. The lattice electrode is disposed close to one of the first and second adherends, and a high-frequency wave is applied. Then the lattice electrode is disposed close to the other of the first and second adherends, and a high-frequency wave is applied.

It is also preferable that the lattice electrode-type high-frequency dielectric heater is used to apply a high-frequency wave. When the lattice electrode-type high-frequency dielectric heater is used, the adherends can be bonded together by performing dielectric heating, for example, from close to a surface layer of each of the first and second adherends, e.g., from close to the adherend whose distance to the high-frequency dielectric heating adhesive sheet is shorter, without influence of the thicknesses of the first and second adherends. By using the lattice electrode-type high-frequency dielectric heater, the bonded body can be produced with reduced energy consumption.

In the figure showing an exemplary embodiment, the dielectric heating adhesion device using the opposed electrodes is used for the purpose of simplification.

EXAMPLES

The invention will next be described by way of Examples. However, the invention is not limited to these Examples.

Method for Producing High-Frequency Dielectric Heating Adhesive Sheet

Example 1

Materials for forming the first bonding layer were pre-mixed in a first container at a composition (% by volume) shown in Table 1. Materials for forming the second bonding layer were also pre-mixed in a second container at a composition (% by volume) shown in Table 1. PP in Table 1 is an abbreviation of polypropylene, and SEBS is an abbreviation of a styrene-ethylene/butylene-styrene copolymer.

PP: The main component is propylene (95% by mass or more), and a flow tart temperature is 175 degrees C.

SEBS: The main component is styrene (67% by mass), and a flow start temperature is 137 degrees C.

One of the pre-mixed materials was supplied to a hopper of a 30 mm twin-screw extruder. The temperature of a cylinder was set to 180 degrees C. or higher and 220 degrees C. or lower, and the temperature of a die was set to 220 degrees C., Then the pre-mixed material was melt-kneaded. The melt-kneaded material was cooled and then cut to produce granular pellets. Specifically, granular pellets for the first bonding layer and granular pellets for the second bonding layer were produced separately. Then the produced granular pellets for the first bonding layer and the produced granular pellets for the second bonding layer were placed in respective hoppers of a single-screw multilayer extruder equipped with a T-die having a feed block. Under the conditions of a cylinder temperature of 220 degrees C. and a die temperature of 220 degrees C., film-shaped melt-kneaded products were extruded from the T die and cooled using cooling rolls to thereby produce a 400-μm-thick high-frequency dielectric heating adhesive sheet having a multilayer structure including the first bonding layer (thickness: 200 μm) and the second bonding layer (thickness: 200 μm).

Examples 2 to 5

In each of Examples 2 to 5, a high-frequency dielectric heating adhesive sheet including an intermediate layer was produced. Materials for forming the intermediate layer was pre-mixed in a third container at a composition (% by volume) shown in Table 1. Granular pellets for the intermediate layer were produced in the same manner as in Example 1. Next, the granular pellets for the first bonding layer, the granular pellets for the intermediate layer, and the granular pellets for the second bonding layer were placed in respective hoppers of a single-screw multilayer extruder equipped with a T-die having a feed block. The cylinder temperature and the die temperature were appropriately set according to the types of resins included in the layers in the high-frequency dielectric heating adhesive sheet, and film-shaped melt-kneaded products were extruded from the T-die and cooled using cooling rolls. A 400-μm-thick high-frequency dielectric heating adhesive sheet having a multilayer structure including the first bonding layer (thickness: 135 μm), the intermediate layer (thickness: 130 μm), and the second bonding layer (thickness: 135 μm) stacked in this order was thereby produced.

PMMA in Table 1 is an abbreviation of polymethyl methacrylate, and PS is an abbreviation of polystyrene.

PMMA: The main component is methyl methacrylate (95% by mass or more), and a flow start temperature is 165 degrees C.

PS: The main component is styrene (95% by mass or more and a flow start temperature is 162 degrees C.

Comparative Examples 1 to 3

High-frequency dielectric heating adhesive sheets in Comparative Examples 1 to 3 were produced in the same manner as in Example 1 except that the compositions of the materials for forming the first bonding layer and the second bonding layer were changed to compositions shown in Table 1 and that the materials were extruded and molded at a cylinder temperature and a die temperature appropriately set according to the types of resins contained in the layers of the adhesive sheets. In Comparative Examples 1 to 3, the ratio of the thicknesses of the first and second bonding layers is the same as that in Example 1.

Comparative Example 4

A high-frequency dielectric heating adhesive sheet in Comparative Example 4 was produced in the same manner as in Example 2 except that the compositions of the materials for forming the first bonding layer, the intermediate layer, and the second bonding layer were changed to compositions shown in Table 1 and that the materials were extruded and molded at a cylinder temperature and a die temperature appropriately set according to the types of resins contained in the layers of the adhesive sheet. In Comparative Example 4, the ratio of the thicknesses of the first bonding layer, the intermediate layer, and the second bonding layer is the same as that in Example 2.

Table 2 shows the volume content of each of the thermoplastic resins in each of the first bonding layer, the second bonding layer, and the intermediate layer in each of the produced high-frequency dielectric heating adhesive sheets and also shows the values of the change rates Vx1 and Vx2 represented by the numerical formulas (Numerical Formula 1) and (Numerical Formula 2) described above.

High-Frequency Bondability

Each of the produced high-frequency dielectric heating adhesive sheets was cut into a size of 25 mm×12.5 mm. First adherends and second adherends made of materials shown in Table 1 were prepared. The size of each of the first adherend and the second adherend was 25 mm×100 mm×2 mm (thickness). The high-frequency dielectric heating adhesive sheets cut into the size described above was held between the first and second adherends. In this case, the first bonding layer of the high-frequency dielectric heating adhesive sheet was brought into contact with the first adherend, and the second bonding layer was brought into contact with the second adherend. The first adherend, the high-frequency dielectric heating adhesive sheet, and the second adherend were fixed between electrodes of a high-frequency dielectric heater ("YRP-400T-A" manufactured by Yamamoto Vinita Co., Ltd.). In the fixed state, a high-frequency wave was applied under high-frequency application conditions described later to bond the high-frequency dielectric heating adhesive sheet and the adherends together, thereby producing an initial test piece.

PP for the material of the first adherend in Table 1 is an abbreviation of polypropylene. PMMA is an abbreviation of polymethyl methacrylate, PS for the material of the second adherend is an abbreviation of polystyrene.

PP: The main component is propylene (95% by mass or more). PMMA; The main component is methyl methacrylate (95% by mass or more).

PS: The main component is styrene (95% by mass or more).

High-Frequency Application Conditions

Frequency: 40.68 MHz

Output power: 200 W

Application time: 10 seconds

Adhesive Force (Tensile Shearing Force)

The tensile shearing force of the initial test piece obtained in the high-frequency bondability evaluation was measured as adhesive force. To measure the tensile shearing force, a universal tensile tester (Instron 5581 manufactured by Instron) was used. The tensile speed in the measurement of the tensile shearing force was 100 mm/minute. The tensile shearing force was measured according to JIS K 6850:1999.

The fracture mode of the test piece in the measurement of the tensile shearing force was observed, and the adhesive force was evaluated according to evaluation criteria shown below. The results of the adhesive force evaluation are shown in Table 1.

Fracture Mode

Cf: Cohesive fracture occurred in the adhesive sheet.

BC: Cohesive fracture occurred in at least one of the first adherend or the second adherend.

$IF_S$: Interlayer peeling occurred in the adhesive sheet.

$IF_A$: Interfacial peeling occurred between the first adherend and the first bonding layer.

$IF_B$: Interfacial peeling occurred between the second adherend and the second bonding layer.

Interlayer Adhesion Property

Each of the produced high-frequency dielectric heating adhesive sheets was subjected to the cross-cut test according to JIS K5600-5-6:1999 to evaluate interlayer adhesion property. Specifically, a surface of the high-frequency dielectric heating adhesive sheet was subjected to corona treatment (200 W·min/m²). A PET film (product name "COSMOSHINE A4300" manufactured by TOYOBO CO., LTD.) was applied to the corona-treated surface of the sheet using a double-sided adhesive sheet (TL-52BM-05 manufactured by LINTEC Corporation) to thereby produce a test piece, and cuts reaching the adhesive layer were made at 2 mm intervals. For a test piece with the PET film applied to the first bonding layer, the cuts were made from the second bonding layer side. For a test piece with the PET film applied to the second bonding layer, the cuts were made from the first bonding layer side.

For each of the layers in the high-frequency dielectric heating adhesive sheet, the ratio of the number of grids that were not peeled off from and were adhering to a layer in contact with the each of the layers was observed, and the interlayer adhesion property was evaluated according to the following evaluation criteria. The results of the evaluation of the interlayer adhesion property are shown in Table 1.

Evaluation Criteria

A1 rating: The ratio of the number of grids that were not peeled off from and were adhering to the layer in contact with the first bonding layer (the second bonding layer or the intermediate layer) and the ratio of the number of grids that were not peeled off from and were adhering to the layer in contact with the second bonding layer (the first bonding layer or the intermediate layer) were 50% or more.

F1 rating: One or both of the ratio of the number of grids that were not peeled off from and were adhering to the layer in contact with the first bonding layer (the second bonding layer or the intermediate layer) and the ratio of the number of grids that were not peeled off from and were adhering to the layer in contact with the second bonding layer (the first bonding layer or the intermediate layer) were less than 50%.

For each of the high-frequency dielectric heating adhesive sheets in Examples 1 to 5, the rating was A1, and the number of remaining grids was 100%.

Volume Average Particle Size of Dielectric Filler

A particle size distribution of a dielectric filler was measured by a laser diffraction/scattering method. A volume average particle size was calculated according to JIS Z 8819-2:2001 using the results of the particle size distribution measurement. The calculated average particle size (volume average particle size) of the dielectric filler (zinc oxide) was 11 μm.

Flow Start Temperature

A flow start temperature of each of the thermoplastic resins used to produce the high-frequency dielectric heating adhesive sheets was measured using a falling-type flow tester (type "CFT-100D" manufactured by Shimadzu Corporation). A stroke displacement rate (mm/min) that varied as the temperature increased was measured at a load of 5.0 kg using a die with a hole shape φ of 2.0 mm and a length of 5.0 mm and a cylinder with an inner diameter of 11.329 mm while the measurement sample was heated at a heating rate of 10 degrees C./minute to thereby obtain a temperature dependence chart of the stroke displacement rate of the sample. In this chart, the temperature at which the stroke displacement rate started increasing again after a peak on the low-temperature side was defined as the flow start temperature.

Dielectric Property

Each of the produced high-frequency dielectric heating adhesive sheets was cut into a size of 30×30 mm. A dielectric material test fixture 16453A (manufactured by Agilent) was attached to an RF impedance/material analyzer E4991A (manufactured by Agilent), and the relative dielectric constant ($\varepsilon'r$) and dielectric dissipation factor($\tan \delta$) of each cut high-frequency dielectric heating adhesive sheet were measured by a parallel plate method under the conditions of 23 degrees C. and a frequency of 40.68 MHz. The value of the dielectric property ($\tan \delta/\varepsilon'r$) was calculated based on the measurement results. For example, the dielectric properties ($\tan \delta/\varepsilon'r$) of the high-frequency dielectric heating adhesive sheets in Examples 1 to 5 are shown in Table 1.

TABLE 1

| | Adhesive sheet composition [% by volume] | | | | | | | | | | | | | | |
|---|---|---|---|---|---|---|---|---|---|---|---|---|---|---|---|
| | First bonding layer | | | | | Intermediate layer | | | | | Second bonding layer | | | | |
| | PP | PMMA | SEBS | PS | ZnO | PP | PMMA | SEBS | PS | ZnO | PP | PMMA | SEBS | PS | ZnO |
| Example 1 | 48 | 0 | 32 | 0 | 20 | — | — | — | — | — | 32 | 0 | 48 | 0 | 20 |
| Example 2 | 80 | 0 | 0 | 0 | 20 | 40 | 0 | 40 | 0 | 20 | 0 | 0 | 80 | 0 | 20 |
| Example 3 | 80 | 0 | 0 | 0 | 20 | 56 | 0 | 24 | 0 | 20 | 0 | 0 | 80 | 0 | 20 |
| Example 4 | 80 | 0 | 0 | 0 | 20 | 50 | 0 | 50 | 0 | 0 | 0 | 0 | 80 | 0 | 20 |
| Example 5 | 0 | 80 | 0 | 0 | 20 | 0 | 40 | 0 | 40 | 20 | 0 | 0 | 0 | 80 | 20 |
| Comparative Example 1 | 40 | 0 | 40 | 0 | 20 | — | — | — | — | — | 8 | 0 | 72 | 0 | 20 |
| Comparative Example 2 | 72 | 0 | 8 | 0 | 20 | — | — | — | — | — | 40 | 0 | 40 | 0 | 20 |
| Comparative Example 3 | 80 | 0 | 0 | 0 | 20 | — | — | — | — | — | 0 | 0 | 80 | 0 | 20 |
| Comparative Example 4 | 80 | 0 | 0 | 0 | 20 | 60 | 0 | 20 | 0 | 20 | 0 | 0 | 80 | 0 | 20 |

| | Dielectric property | Adherend | | | Interlayer |
|---|---|---|---|---|---|
| | $\tan\delta/\varepsilon'r$ [-] | First adherend | Second adherend | Fracture mode | adhesion property |
| Example 1 | 0.015 | PP | PS | Cf or BC | A1 |
| Example 2 | 0.014 | PP | PS | Cf or BC | A1 |
| Example 3 | 0.015 | PP | PS | Cf or BC | A1 |
| Example 4 | 0.010 | PP | PS | Cf or BC | A1 |
| Example 5 | 0.015 | PMMA | PS | Cf or BC | A1 |
| Comparative Example 1 | — | PP | PS | $IF_A$ | F1 |
| Comparative Example 2 | — | PP | PS | $IF_B$ | F1 |
| Comparative Example 3 | — | PP | PS | $IF_S$ | F1 |
| Comparative Example 4 | — | PP | PS | $IF_S$ | F1 |

TABLE 2

| | First bonding layer Thermoplastic resin | | | | Intermediate layer Thermoplastic resin | | | | Second bonding layer Thermoplastic resin | | | | (Numerical Formula 1) Vx1 [%] | (Numerical Formula 2) Vx2 [%] |
|---|---|---|---|---|---|---|---|---|---|---|---|---|---|---|
| | First | | Second | | First | | Second | | Second | | First | | | |
| | Type | Content VA1 [% by volume] | Type | Content VB2 [% by volume] | Type | Content VB1 [% by volume] | Type | Content VB2 [% by volume] | Type | Content VA2 [% by volume] | Type | Content VB1 [% by volume] | | |
| Example 1 | PP | 60 | SEBS | 40 | — | — | — | — | SEBS | 60 | PP | 40 | 33.3 | 33.3 |
| Example 2 | PP | 100 | — | 0 | PP | 50 | SEBS | 50 | SEBS | 100 | — | 0 | 50.0 | 50.0 |
| Example 3 | PP | 100 | — | 0 | PP | 70 | SEBS | 30 | SEBS | 100 | — | 0 | 30.0 | 70.0 |
| Example 4 | PP | 100 | — | 0 | PP | 50 | SEBS | 50 | SEBS | 100 | — | 0 | 50.0 | 50.0 |
| Example 5 | PMMA | 100 | — | 0 | PMMA | 50 | PS | 50 | PS | 100 | — | 0 | 50.0 | 50.0 |
| Comparative Example 1 | PP | 50 | SEBS | 50 | — | — | — | — | SEBS | 90 | PP | 10 | 80.0 | 44.4 |
| Comparative Example 2 | PP | 90 | SEBS | 10 | — | — | — | — | SEBS | 50 | PP | 50 | 44.4 | 80.0 |
| Comparative Example 3 | PP | 100 | — | 0 | — | — | — | — | SEBS | 100 | — | 0 | 100.0 | 100.0 |
| Comparative Example 4 | PP | 100 | — | 0 | PP | 80 | SEBS | 20 | SEBS | 100 | — | 0 | 20.0 | 80.0 |

In the high-frequency dielectric heating adhesive sheets in Examples 1 to 5, no interlayer peeling occurred, and the first adherend and the second adherend were firmly bonded together, as shown in Tables 1 and 2.

In the high-frequency dielectric heating adhesive sheet in Comparative Example 1, since the volume content of the first thermoplastic resin (PP) in the first bonding layer was less than 60% by volume, interfacial peeling occurred between the first bonding layer and the first adherend.

In the high-frequency dielectric heating adhesive sheet in Comparative Example 2, since the volume content of the second thermoplastic resin (SEBS) in the second bonding layer was less than 60% by volume, interfacial peeling occurred between the second bonding layer and the second adherend.

In the high-frequency dielectric heating adhesive sheets in Comparative Examples 3 to 4, since the change rates Vx2 for the compositions of the first bonding layer, the second bonding layer, and the intermediate layer were 80% or more, interlayer peeling occurred.

Therefore, the high-frequency dielectric heating adhesive sheets in Comparative Examples 1 to 4 were unable to bond the first and second adherends together.

The invention claimed is:

1. A high-frequency dielectric heating adhesive sheet comprising:
   a first bonding layer serving as an outermost layer; and
   a second bonding layer serving as an outermost layer and located on a side opposite to the first bonding layer, wherein
   the first bonding layer comprises: a first thermoplastic resin; and a first dielectric filler that generates heat under application of a high-frequency wave,
   the second bonding layer comprises: a second thermoplastic resin; and a second dielectric filler that generates heat under application of a high-frequency wave,
   the first thermoplastic resin and the second thermoplastic resin are different resins,
   a volume content VA1 of the first thermoplastic resin with respect to a total volume of all thermoplastic resins in the first bonding layer is in a range from 60% by volume to 100% by volume,
   a volume content VA2 of the second thermoplastic resin with respect to the total volume of all thermoplastic resins in the second bonding layer is in a range from 60% by volume to 100% by volume,
   a change rate Vx1 represented by a numerical formula (Numerical Formula 1) below and indicating a rate of change between the volume content VA1 of the first thermoplastic resin and a volume content VB1 of the first thermoplastic resin with respect to the total volume of all thermoplastic resins in a layer (1) in direct contact with the first bonding layer is less than 80%,
   a change rate Vx2 represented by a numerical formula (Numerical Formula 2) below and indicating a rate of change between the volume content VA2 of the second thermoplastic resin and a volume content VB2 of the second thermoplastic resin with respect to the total volume of all thermoplastic resins in a layer (2) in direct contact with the second bonding layer is less than 80%,
   when an intermediate layer is disposed between the first bonding layer and the second bonding layer, the layer (2) in direct contact with the second bonding layer is the intermediate layer, and the layer (1) in direct contact with the first bonding layer is the intermediate layer, and
   when the first bonding layer is in direct contact with the second bonding layer, the layer (2) in direct contact with the second bonding layer is the first bonding layer, and the layer (1) in direct contact with the first bonding layer is the second bonding layer, $$Vx1 = \{(VA1 - VB1)/VA1\} \times 100 \quad \text{(Numerical Formula 1)}$$

$$Vx2 = \{(VA2 - VB2)/VA2\} \times 100 \quad \text{(Numerical Formula 2)}.$$

2. The high-frequency dielectric heating adhesive sheet according to claim 1, wherein
   the high-frequency dielectric heating adhesive sheet is a sheet for bonding together a first adherend and a second adherend made of a material different from a material forming the first adherend,
   the first adherend comprises a third thermoplastic resin,
   the second adherend comprises a fourth thermoplastic resin,
   a main component of the first thermoplastic resin is the same as a main component of the third thermoplastic resin, a main component of the second thermoplastic resin is the same as a main component of the fourth thermoplastic resin, the first bonding layer is bonded to the first adherend, and the second bonding layer is bonded to the second adherend.

3. The high-frequency dielectric heating adhesive sheet according to claim 1, wherein at least one of a volume content of the first dielectric filler in the first bonding layer or a volume content of the second dielectric filler in the second bonding layer is in a range from 5% by volume to 50% by volume.

4. The high-frequency dielectric heating adhesive sheet according to claim 1, wherein at least one of the first dielectric filler or the second dielectric filler is at least one selected from the group consisting of zinc oxide, silicon carbide, titanium oxide, and barium titanate.

5. The high-frequency dielectric heating adhesive sheet according to claim 1, wherein at least one of a volume average particle size of the first dielectric filler or a volume average particle size of the second dielectric filler is in a range from 1 μm to 30 μm, and the volume average particle size is determined by measuring a particle size distribution of the at least one of the first dielectric filler or the second dielectric filler by a laser diffraction/scattering method and calculating the volume average particle size according to JIS Z 8819-2:2001 from results of the measurement of the particle size distribution.

6. The high-frequency dielectric heating adhesive sheet according to claim 1, wherein the first thermoplastic resin is a polyolefin resin.

7. The high-frequency dielectric heating adhesive sheet according to claim 1, wherein an absolute value of a difference between a flow start temperature $Tx1$ of the first thermoplastic resin and a flow start temperature $Tx2$ of the second thermoplastic resin satisfies a relationship of a numerical formula (Numerical Formula 4) below, $|Tx1-Tx2| \leq 70$ degrees C. (Numerical Formula 4).

8. The high-frequency dielectric heating adhesive sheet according to claim 1, wherein in each of the layers included in the high-frequency dielectric heating adhesive sheet, after a cross-cut test according to JIS K5600-5-6:1999, a ratio of the number of grids that are not peeled off from and are adhering to a layer in contact with the each of the layers is 50% or more.

9. The high-frequency dielectric heating adhesive sheet according to claim 1, wherein the intermediate layer is disposed between the first bonding layer and the second bonding layer.

10. The high-frequency dielectric heating adhesive sheet according to claim 9, wherein the intermediate layer comprises the first thermoplastic resin and the second thermoplastic resin.

11. The high-frequency dielectric heating adhesive sheet according to claim 1, wherein the layer (1) in direct contact with the first bonding layer is the second bonding layer.

* * * * *